(12) United States Patent
Loew

(10) Patent No.: US 11,852,273 B1
(45) Date of Patent: Dec. 26, 2023

(54) STUD ISOLATOR WITH INTEGRATED NAIL PROTECTION

(71) Applicant: INP PIPE PRO LLC, Seattle, WA (US)

(72) Inventor: Shannon Alexander Loew, Seattle, WA (US)

(73) Assignee: INP PIPE PRO LLC, Seattle, WA (US)

( * ) Notice: Subject to any disclaimer, the term of this patent is extended or adjusted under 35 U.S.C. 154(b) by 0 days.

(21) Appl. No.: 18/150,920

(22) Filed: Jan. 6, 2023

Related U.S. Application Data

(60) Provisional application No. 63/356,573, filed on Jun. 29, 2022.

(51) Int. Cl.
*F16L 57/00* (2006.01)

(52) U.S. Cl.
CPC ................... *F16L 57/00* (2013.01)

(58) Field of Classification Search
CPC .............. F16L 57/00; F16L 57/06; F16L 5/00
See application file for complete search history.

(56) References Cited

U.S. PATENT DOCUMENTS

| | | | | |
|---|---|---|---|---|
| 630,428 | A * | 8/1899 | Wahlert | F16L 5/00 126/317 |
| 2,514,504 | A * | 7/1950 | Moline | F16L 5/00 285/194 |
| 4,023,697 | A * | 5/1977 | Marrero | F16L 57/00 220/3.7 |
| 10,555,729 | B1 * | 2/2020 | Cole | F16L 57/00 |
| 2003/0029692 | A1 * | 2/2003 | Rogner | F16L 57/00 192/112 |
| 2006/0054340 | A1 * | 3/2006 | Auray | F16L 5/00 174/650 |
| 2010/0071293 | A1 * | 3/2010 | Cannistraro | F16L 5/00 403/223 |
| 2010/0253069 | A1 * | 10/2010 | Bartholoma | F16L 5/00 285/140.1 |

(Continued)

OTHER PUBLICATIONS http://web.archive.org/web/20160712103428/https://www.supplyhouse.com/Holdrite-262A-3-4-Silencer-Wood-Stud-Isolator (Year: 2016).*

*Primary Examiner* — Matthew Troutman
*Assistant Examiner* — Fannie C Kee
(74) *Attorney, Agent, or Firm* — WORKMAN NYDEGGER

(57) ABSTRACT

A stud isolator with integrated nail protection, providing both isolation, and nail protection in a single device, with installation of a single product. Such an isolator includes an insertion body sized and configured for insertion into the stud bore hole. The insertion body includes a faceplate attached to the front end of the insertion body, so as to serve as a stop and attachment point to the stud, when the insertion body is inserted into the stud bore hole. The insertion body includes a hollow channel for receipt of a plumbing pipe extending through the stud bore hole. In addition, either a separate metal boring liner is provided inserted into the bore hole, with the insertion body inserted therein, or a metal nail protection collar is provided received in the insertion body of the isolator. In either case, nail protection is provided to the pipe received within the isolator.

14 Claims, 21 Drawing Sheets

(56) References Cited

U.S. PATENT DOCUMENTS

2016/0146386 A1* 5/2016 Blake ................... F16L 57/00
                                                    285/45
2016/0356403 A1* 12/2016 Perrigo ................. F16L 5/00
2019/0368206 A1* 12/2019 Altero-Marquez ....... F16L 5/00
2021/0270392 A1* 9/2021 Popov ................... F16L 5/00

* cited by examiner

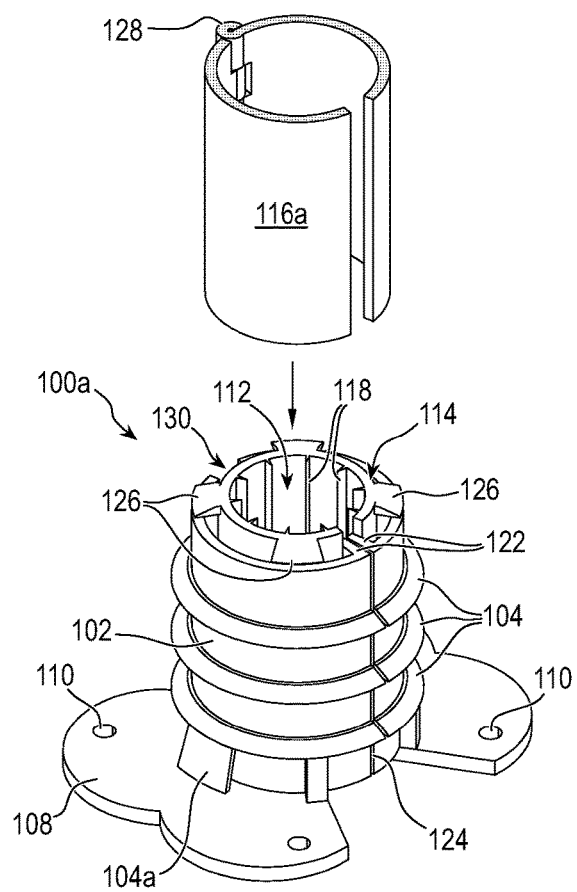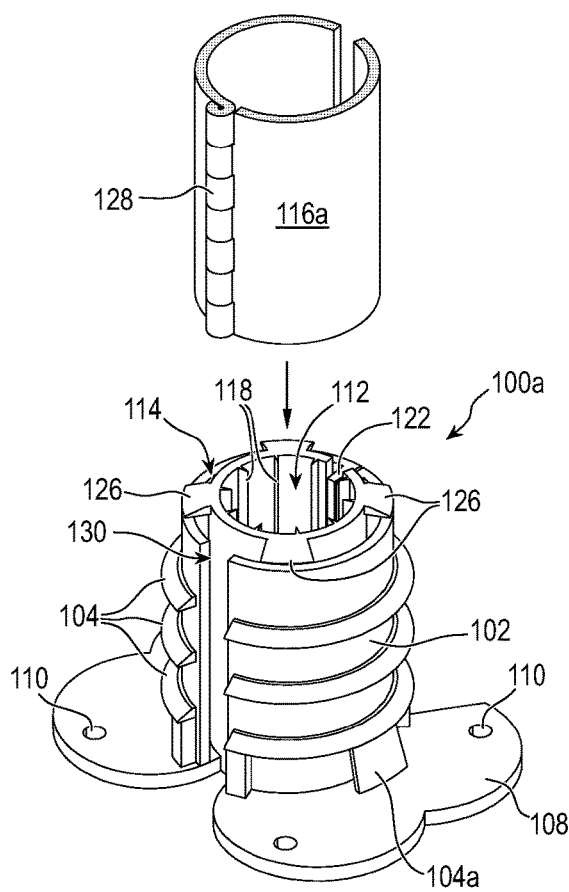
*FIG. 7A*  *FIG. 7B*
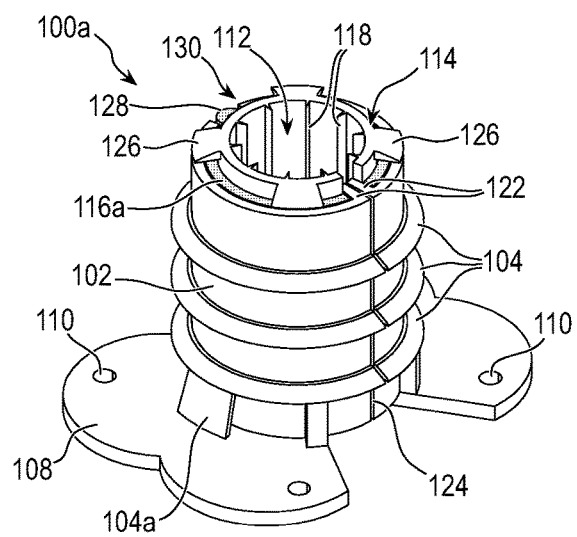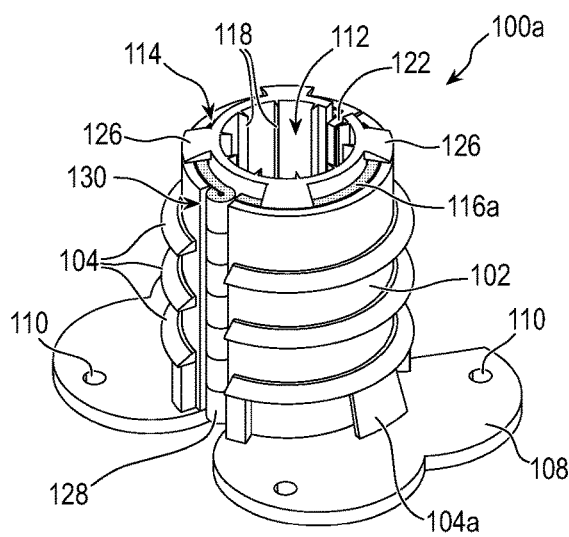
*FIG. 7C*  *FIG. 7D*

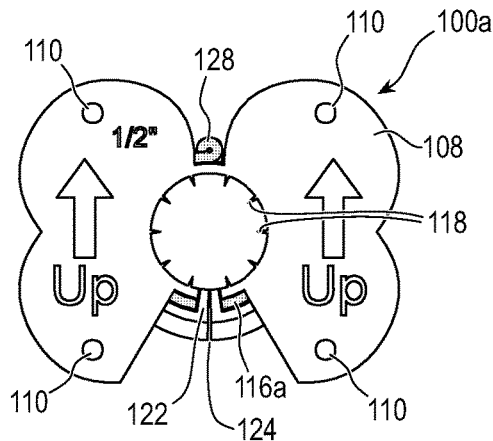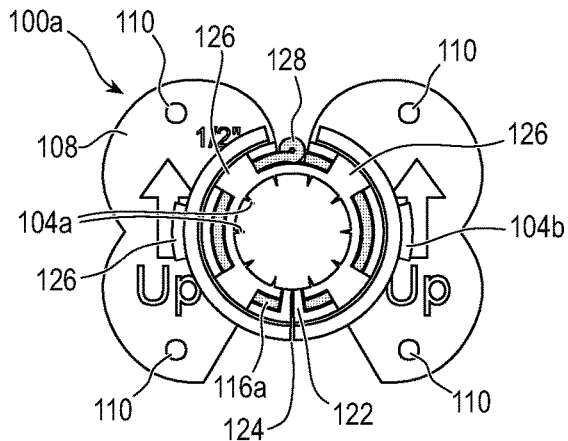
FIG. 8C  FIG. 8D
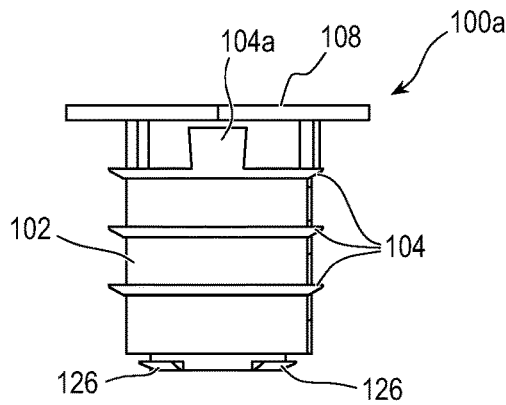
FIG. 8E
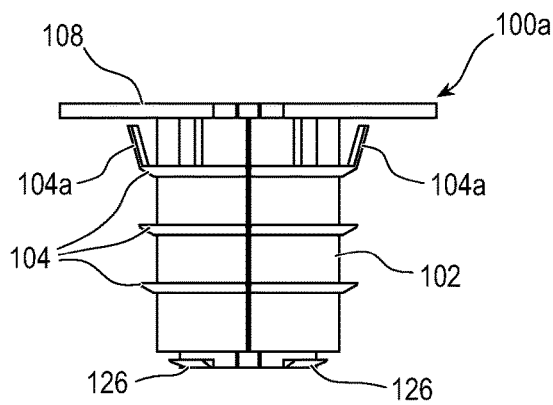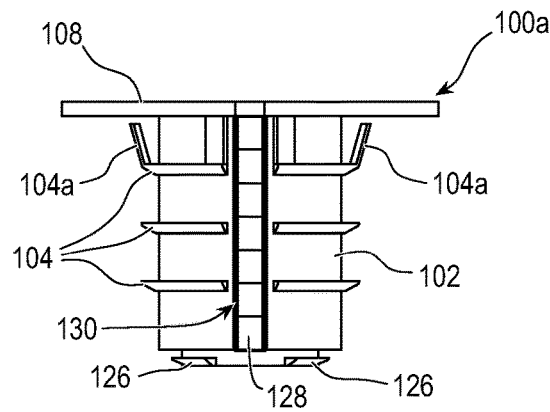
FIG. 8F  FIG. 8G

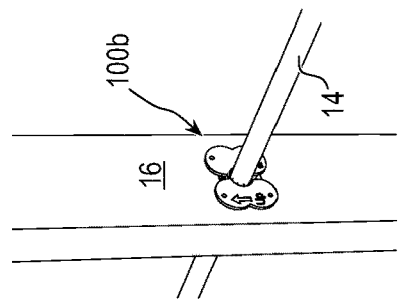
FIG. 12G
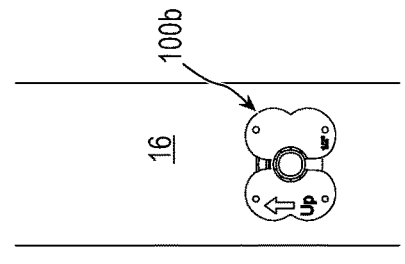
FIG. 12H
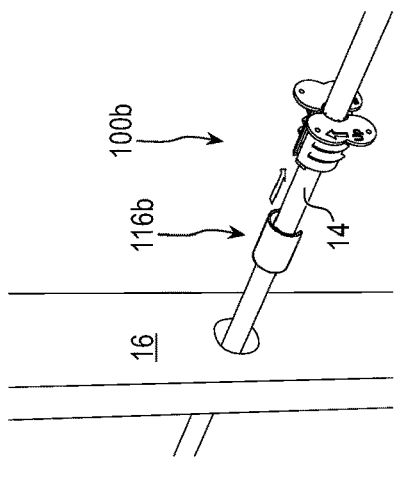
FIG. 12E
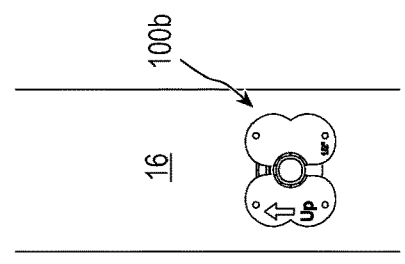
FIG. 12F
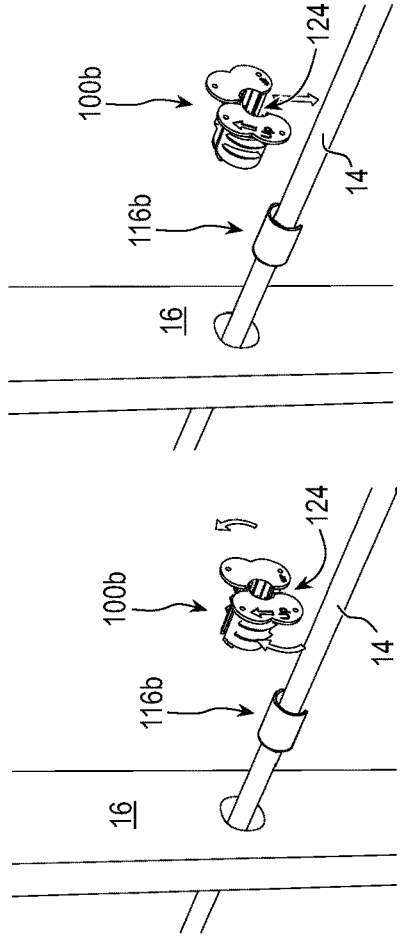
FIG. 12C
FIG. 12A
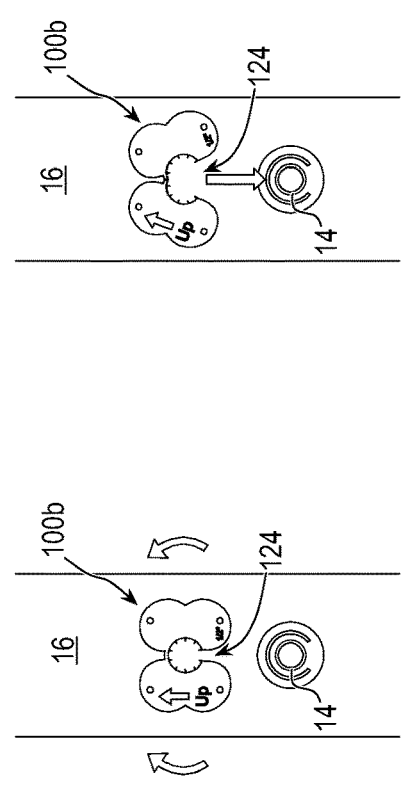
FIG. 12D
FIG. 12B

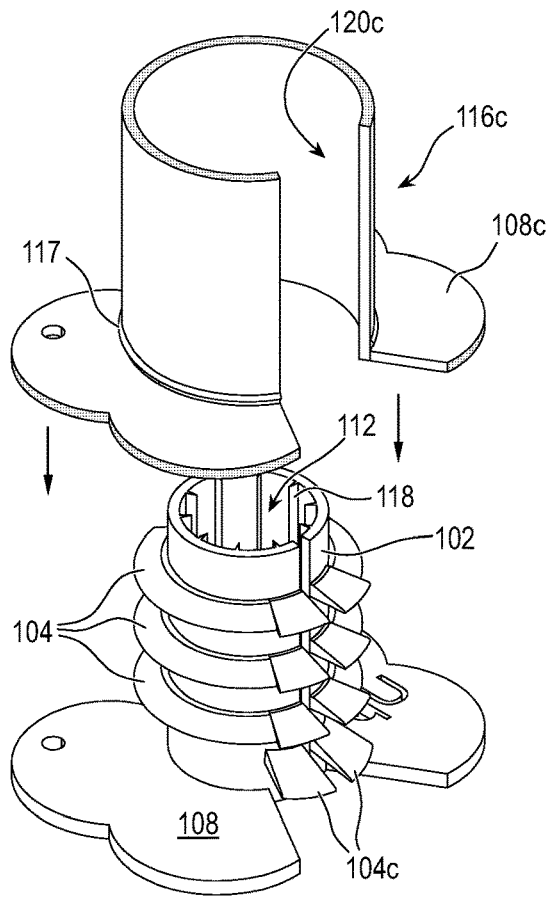
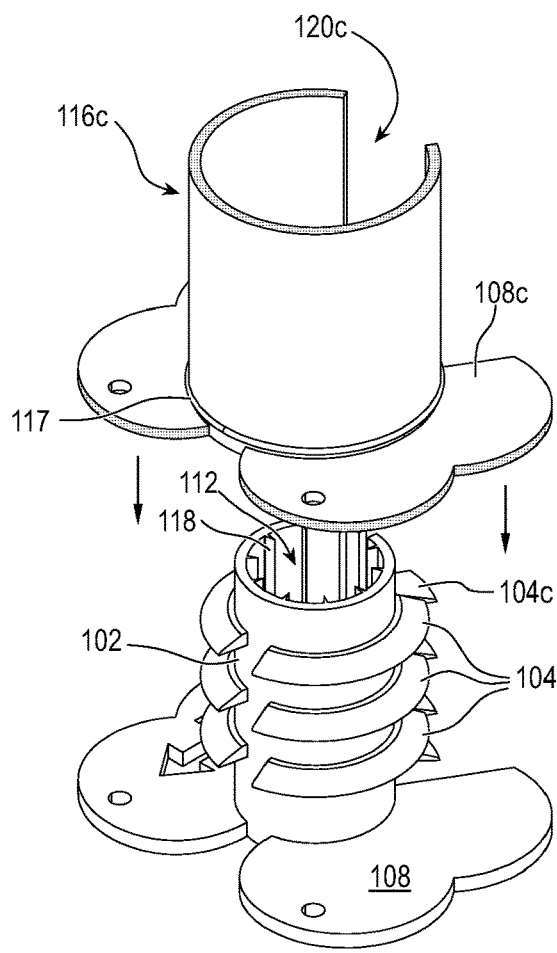
FIG. 13A
FIG. 13B
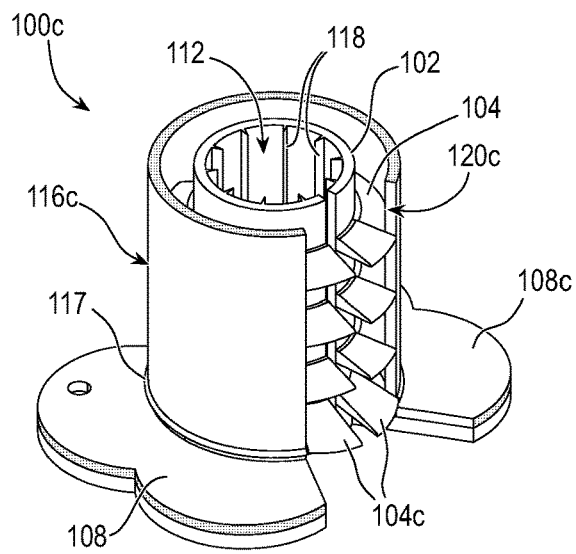
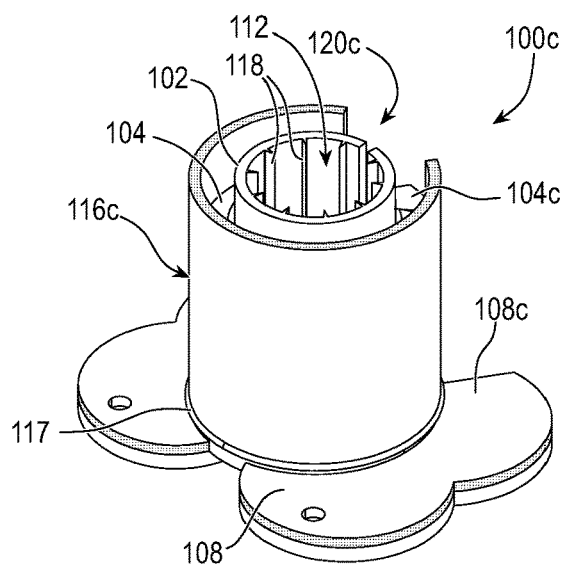
FIG. 13C
FIG. 13D

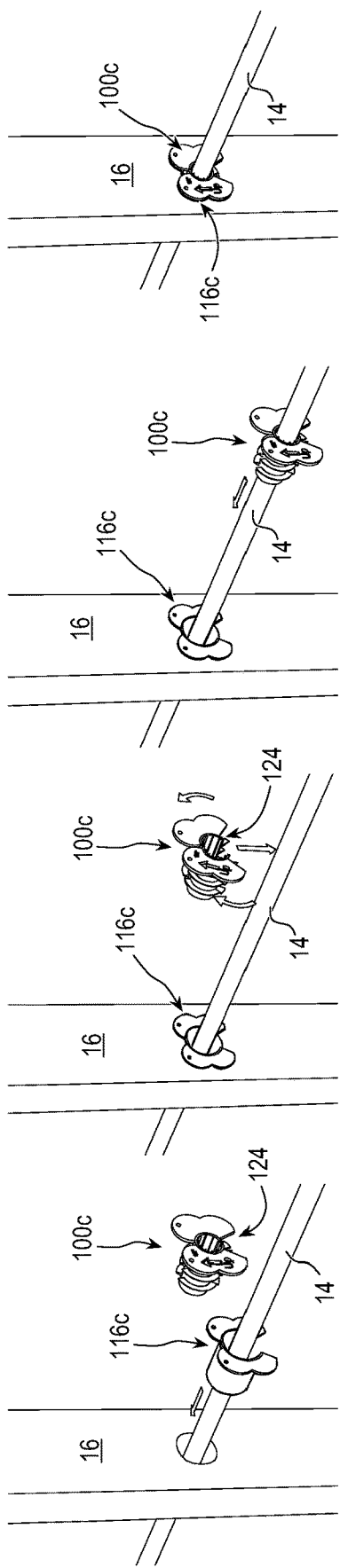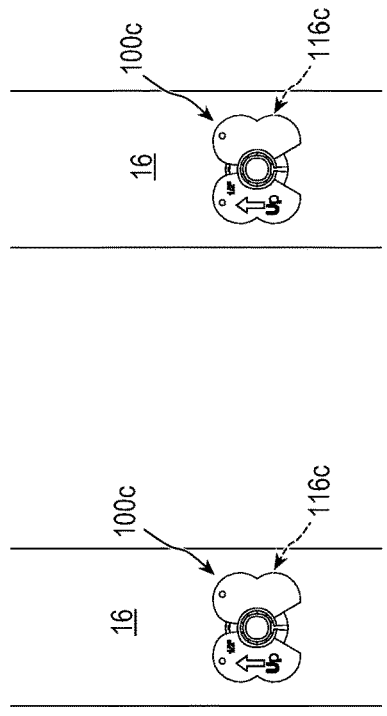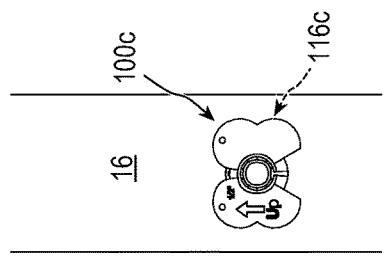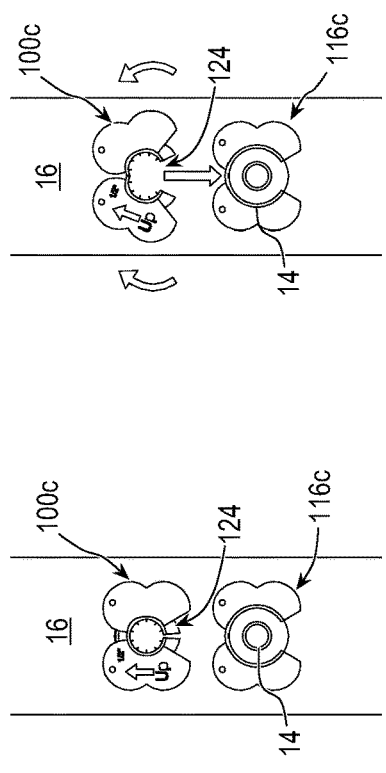

STUD ISOLATOR WITH INTEGRATED NAIL PROTECTION

CROSS-REFERENCE TO RELATED APPLICATIONS

The present application claims the benefit under 35 U.S.C. 119(e) of U.S. Application No. 63/356,573, filed Jun. 29, 2022, which is herein incorporated by reference in its entirety.

BACKGROUND OF THE INVENTION

1. The Field of the Invention

The present invention is in the field of plumbing isolators, and nail protection for plumbing pipes passing through studs.

2. The Relevant Technology

For commercial and multi-family residential construction, the Uniform Plumbing Code (UPC) requires two separate measures to protect plumbing embedded in stud walls where pipe passes through studs: isolating the pipe from the stud as it passes through the stud (typically performed by products known as a stud insulator, a pipe insulator, a collar, an insert, or silencer); and protecting the pipe from damage by nail penetrations made into the stud (typically performed by products known as a protector plates, nail plates, stud protector, or stud guard). Both are required for commercial and multi-family residential construction, wherever a length of pressurized plumbing pipe passes through a stud of any type. The current solution for meeting both code-required measures is to install BOTH nail protection in the form of a nail plate on the outside face of the stud AND a stud isolator wrapped around the pipe at each stud. These are two separate two separate products (the isolator and the nail plate), sold separately, and installed in two separate processes.

This is true for all pipe types (e.g. PEX, copper, etc.) and all stud types (e.g. metal stud or wood stud).

As such, there is a need for improved products and methods, which may simplify current practice, while still meeting the requirements of the UPC requirements.

BRIEF SUMMARY

The present invention is directed to a stud isolator that includes integrated nail protection, providing both isolation, and nail protection in a single device, where both requirements of the UPC (e.g., see UPC 312.9 and UPC 313.0; 313.3) are met with installation of a single device. Such an isolator includes an insertion body sized and configured for insertion into the stud bore hole. The insertion body includes a faceplate attached to the front end of the insertion body, so as to serve as a stop and attachment point of the device to the stud, when the insertion body is inserted into the stud bore hole. The insertion body includes a hollow channel for receipt of a plumbing pipe extending through the stud bore hole. Depending on the embodiment of the isolator, either a separate metal boring liner is provided inserted into the bore hole, with the insertion body of the isolator also being inserted therein, or a metal nail protection collar is provided received in the insertion body of the isolator. In either case, nail protection is provided to the pipe received within the isolator. Various exemplary devices are described herein.

An exemplary embodiment of the plumbing stud isolator with integrated nail protection includes an insertion body sized and configured for insertion into a bore hole through a stud, wherein the insertion body includes a periphery that extends towards and/or engages with edges of the bore hole through the stud, the insertion body including an insertion end and a front end. The isolator may include a faceplate attached to the front end of the insertion body, where the faceplate has a size and shape that is larger than the bore hole through the stud, so as to serve as a stop against the stud, when the insertion body of the isolator is inserted into the bore hole through the stud. The faceplate may also serve as an attachment point of the isolator device to the stud (e.g., through nail holes provided through the faceplate). The insertion body includes a first hollow channel for receipt of the plumbing pipe to be protected and isolated, that extends through the stud bore hole. In an embodiment, the insertion body further includes a second hollow channel, e.g., concentric with and radially outward from the first hollow channel, where the second channel is configured to receive the metal nail protection collar (e.g., a curved metal nail protection collar). With the metal nail protection collar located within the second channel (e.g., from the insertion end of the insertion body, towards the front end and faceplate), and the insertion body of the isolator pressed into the bore hole through the stud, with the plumbing pipe passing through the first channel, the pipe is covered by the curved nail protection collar, preventing a nail driven through the wall side of the stud from penetrating to the pipe and satisfying UPC code requirement for nail protection. In addition, the pipe is firmly held within the first channel of the isolator, providing the code required isolation. The device thus provides the necessary nail protection and stud isolation, all within a single device.

In an embodiment, the nail protection collar is configured as two initially separate pieces each having a generally c-shaped or generally semi-circular cross section, insertable into the second hollow channel so as to form a generally hollow clamshell cylindrical shape once inserted into the second hollow channel. The insertion body can be formed of plastic and is sufficiently flexible so as to allow the insertion body with the hinged metal collar received therein to flex open, and be placed over the plumbing pipe.

In another embodiment, the nail protection collar is configured as a one-piece fixed metal collar that slides into or is otherwise received into the second hollow channel. Such a fixed metal collar can be open or include a gap at a bottom end, so as to allow the fixed metal collar to be fitted over the plumbing pipe, and then slid into the bore hole once received into the second hollow channel of the insertion body of the isolator.

In another embodiment, the nail protection collar can be configured as a hinged metal collar that slides into the second hollow channel. Such a hinged configuration may allow the metal nail protection collar to hingedly open over the pipe, during installation, and then close around the pipe. Such hinge functionality may be possible when the nail protection collar is separate from the plastic portion of the isolator, or even when the two are connected together. For example, such a hinged metal collar is received into the second hollow channel of the insertion body, the insertion body being formed of plastic and being sufficiently flexible so as to allow the insertion body with the hinged metal collar received therein to flex open, and be placed over the plumbing pipe.

Another embodiment may be referred to as a boring liner embodiment. For example, such an embodiment may include an insertion body sized and configured for insertion into a bore hole through a stud, wherein the insertion body includes a periphery that extends outward towards edges of the bore hole through the stud. The insertion body includes an insertion end and a front end. A faceplate of the isolator is attached to the front end of the insertion body, where the faceplate has a size and shape that is larger than the bore hole through the stud, so that the faceplate serves as a stop against the stud. The faceplate may also serve as an attachment point of the isolator to the stud (e.g., through nail holes provided through the faceplate). The insertion body includes a first hollow channel for receipt of a plumbing pipe extending through the bore hole through the stud. A metal nail protection member is further provided, configured as a boring liner with a corresponding boring liner faceplate. In this embodiment, the metal boring liner is inserted into the bore hole through the stud, and the plastic insertion body is inserted into the bore hole afterwards, sandwiching the boring liner between the edge of the stud bore hole and the plastic insertion body. The boring liner engages with the edges of the bore hole through the stud, so as to surround the insertion body, and the plumbing pipe to be protected, which passes through the first hollow channel running through the insertion body. The metal boring liner faceplate is aligned with the plastic faceplate attached to the front end of the insertion body. Both the metal boring liner faceplate and the plastic faceplate attached to the insertion body may include nail holes therethrough. When both faceplates are aligned, the nail holes are also aligned.

In any of the four described embodiments, nail protection and isolation are provided to the pipe, with a single device. No separate nail protection plates are required, for attachment over the wall surfaces of the studs or elsewhere. While four exemplary embodiments are provided, various other configurations providing similar benefits will be apparent to those of skill in the art, and are within the scope of the present disclosure.

In any of the described embodiments, the insertion body may further include a plurality of flexible pipe engaging ribs extending radially inwardly from the insertion body into the first hollow channel, so as to accommodate different diameters of plumbing pipe within the first hollow channel. In any of the described embodiments, the flexible pipe engaging ribs and the first channel can be sized to accommodate receipt of either a nominal ¾ inch plumping pipe, or a nominal ½ inch plumping pipe into the first hollow channel, as selected by the user. This allows an isolator device of a given configuration to be suitable for use with two differently sized pipes. The nominal ½ inch and ¾ inch pipe sizes are merely exemplary, and it will be appreciated that such a device may be made to be compatible with any plurality of various pipe sizes.

In various of the described embodiments, the isolator may be provided with the nail protection collar already received within the second hollow channel of the insertion body. In another embodiment, the metal nail protection collar could be provided separately, for insertion into the insertion body at the time of use.

In any of the described embodiments, the isolator may be configured to allow a user or a building inspector to visually verify that the nail protection collar is received within the bore hole through the stud, providing protection to the plumbing pipe. For example, the second hollow channel can be sufficiently open at both the insertion end and the front end, allowing the user or inspector to visually verify that the nail protection collar is received within the second hollow channel, from either end of the isolator, even once the isolator is installed in a stud. The embodiment including a boring liner outside of the insertion body of the isolator can similarly allow for visual verification of proper positioning of the nail protection member even when installed in the stud.

In various of the described embodiments, the nail protection collar can be configured as a generally hollow curved, cylindrical shape.

In an embodiment, the nail protection collar can be configured as a generally hollow cylindrical shape, with one or more discontinuities adjacent a bottom (or top) of the nail protection collar. Such a shape may allow the nail protection collar to be positioned over the pipe during installation, even if the nail protection collar is configured as a single piece fixed liner.

In any of the described embodiments, the faceplate can include one or more holes therethrough, for receipt of nails to secure the isolator to a face of a stud.

In an embodiment including a metal boring liner, the boring liner may include a radially extending bead adjacent the boring liner faceplate, to aid in securing the boring liner in the stud.

Any of the various described embodiments where the nail protection collar is received in the second channel of the insertion body may further include flanges or other structure for ensuring that the nail protection collar remains positioned in its designated channel.

Any of the various described embodiments where the insertion body engages with the edges of the stud bore hole may be such that the insertion body includes one or more radially extending flanges, to aid in securing the isolator in any stud type. For example, flanges may be provided for securing the isolator within a wood stud, as well as differently configured flanges for securing the isolator within a metal stud. Both types of flanges may be provided within any given device, so that any given device is compatible for use with both metal and wood studs.

Any of the various described embodiments may be inserted around the pipe and be adjusted in location before being inserted into the stud. Additionally, with any of the various embodiments, the pipe may be repositioned within the stud wall even after the isolator is installed around the pipe and inserted into the stud.

Any of the various described embodiments may be removed from the stud once inserted and then reinserted as needed in the same or any other location.

The present devices can be used with any type of pressurized plumbing pipe (e.g., (e.g. PEX, copper, etc.), as well as any stud type (e.g. metal stud or wood stud), where the requirements of the UPC (e.g., UPC 312.9 and UPC 313.0; 313.3) are applicable. It will be appreciated that such devices may also be suitable for use in other environments or other uses, where isolation of a pipe and nail protection are desired, e.g., whether such pipe is pressurized or not.

It will be appreciated that the isolator is also suitable for single family construction wherever code may require nail protection but may not require stud isolators as any of the described embodiments will meet the code requirements for nail protection alone.

A method may also be provided, for installing a plumbing stud isolator with integrated nail protection. Such a method may include providing any of the isolators as described herein, and positioning the metal nail protection member or nail protection collar over a plumbing pipe, and integrating the metal nail protection member or nail protection collar with the insertion body, so that the metal nail protection member or nail protection collar is received into the bore hole of the stud, providing protection to the pipe received through the insertion body of the isolator. Such a method provides both isolation of the plumbing pipe and nail protection to the plumbing pipe, without installation of any nail protection collar over a face of the stud.

Advantageously, any of the various embodiments described herein may be installed in a similar manner as existing isolators, requiring no new tools, skills or certifications.

Features from any of the disclosed embodiments may be used in combination with one another, without limitation. This summary is provided to introduce a limited selection of concepts in a simplified form that are further described below in the detailed description. This summary is not necessarily intended to identify key or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the components and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings.

FIGS. 7A-7B show front and rear isometric views of another exemplary plumbing stud isolator (e.g., a hinged configuration) with integrated nail protection according to an embodiment of the present invention, with the hinged nail protection collar shown exploded from the insertion body.

FIGS. 7C-7D show front and rear isometric views of the exemplary plumbing stud isolator with integrated nail protection of FIGS. 7A-7B, with the hinged nail protection collar received into the insertion body.

FIG. 8A-8G show additional isometric views of the isolator of FIGS. 7A-7B, ready for positioning over a plumbing pipe, and insertion into a bore hole through a stud.

FIGS. 12A-12H sequentially show exemplary steps associated with installation of the isolator seen in FIGS. 10A-11G.

FIGS. 13A-13B show front and rear isometric views of another exemplary plumbing stud isolator (e.g., a boring liner configuration) with integrated nail protection according to an embodiment of the present invention, with the boring liner nail protection member shown exploded from the insertion body.

FIGS. 13C-13D show front and rear isometric views of the exemplary plumbing stud isolator with integrated nail protection of FIGS. 13A-13B, with the boring liner nail protection member positioned over the insertion body.

FIGS. 15A-15H sequentially show exemplary steps associated with installation of the isolator seen in FIGS. 13A-14G.

DETAILED DESCRIPTION OF THE PREFERRED EMBODIMENTS

A. Introduction

Figure 1:
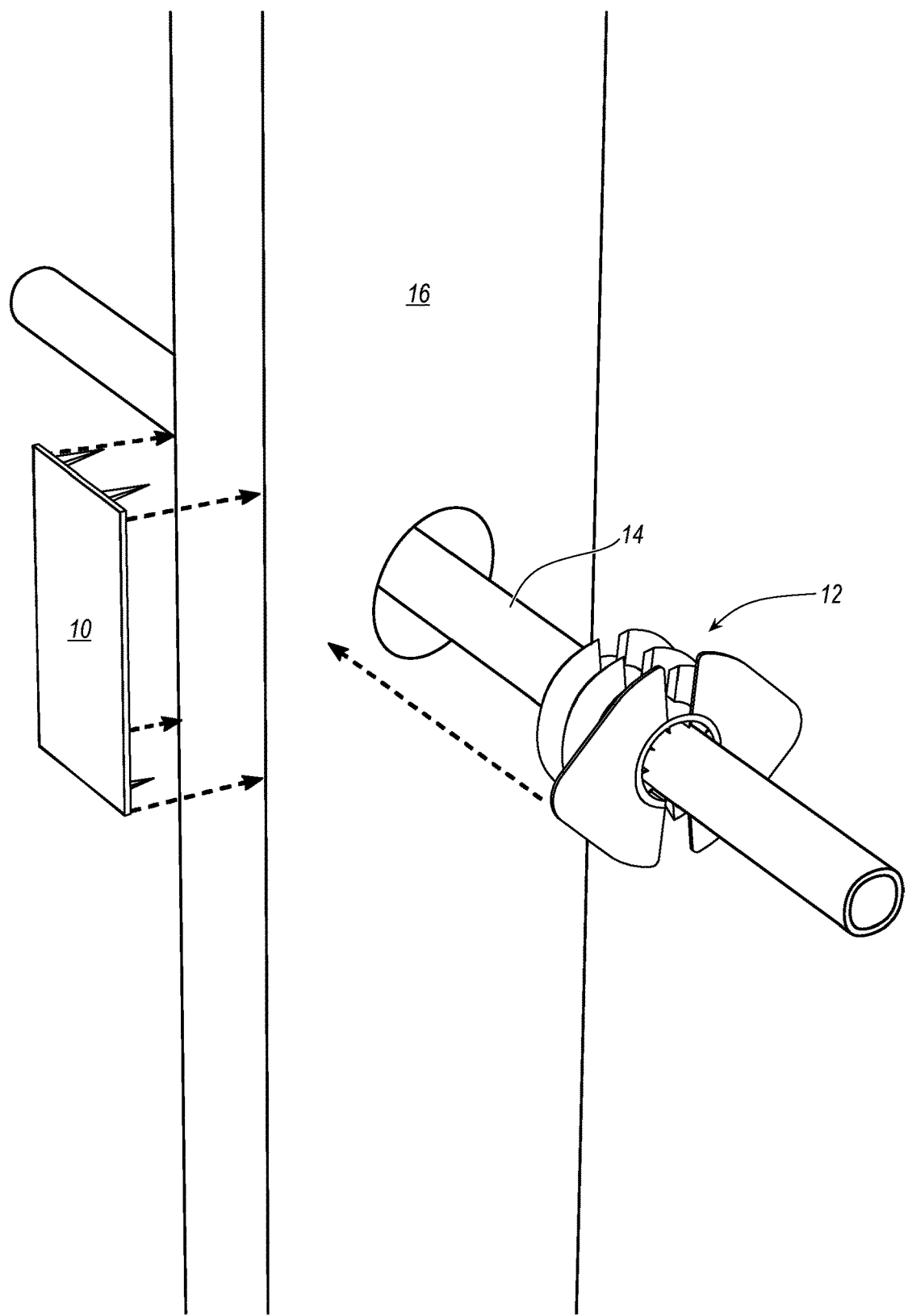
FIG. 1 generally shows how current practice requires the installation of two separate components, in two separate installation steps.

The product described herein is a new product that meets the two separate requirements of the UPC code for pipe isolation and nail protection, within a single product, thus replacing the two separate products for isolating and protecting a length of pipe as it passes through a stud. Such an integrated product may be referred to as a stud isolator with integrated nail protection. Such a product includes a curved metal collar with a specially designed stud isolator (e.g., formed from plastic). As a result, an installer may meet both code requirements with the use of a single product, that can be installed in a single step (rather than the two-steps and two products required for existing solutions). For example, FIG. 1 shows how existing solutions require installation of a nail plate 10, in addition to an isolator 12 to protect plumbing pipe 14 as it passes through stud 16 (e.g., a metal or wood stud). Code dictates that in commercial and multifamily residential construction, both the nail protection (e.g. plate 10) and isolation (e.g. isolator 12) must be provided, at each location where such a pipe passes through a stud.

B. Exemplary Devices and Methods of Use

FIGS. 2A-2D illustrate an exemplary isolator 100 including integrated nail protection, eliminating the need for any separate nail plate 10, such as that shown in FIG. 1. Isolator 100 is shown as including an insertion body 102 sized and configured for insertion into a bore hole through a stud (e.g., stud 16). For example, in an embodiment, the insertion body 102 may have a diameter so as to snuggly fit (e.g., friction fit) within a standard 1⅜ inch stud boring hole. It will of course be appreciated that sizes could be altered, or devices provided in different sizes, for compatibility with different bore hole sizes. Similarly, the insertable length of the insertion body 102 may be such as to protect the full length of a boring hole through a standard 2×4 or 2×6 stud (both of which are about 1½ inches thick). Insertion body 102 may include a periphery (e.g., a plurality of radially outward extending flexible ridges 104), which engages with the edges of the bore hole through the stud during use. In addition to flexible ridges 104, insertion body 102 may further or alternatively include one or more biased flanges 104a adjacent faceplate 108, at the front end 106b of insertion body 102. Such flanges 104a may be configured to engage with the edge of a metal stud. Thus, even if flexible ridges 104 may not engage with such a metal stud (which may typically be hollow), the flanges 104a will provide the desired engagement, so that the isolator is compatible with both wood studs (engagement provided by ridges 104) and metal studs (engagement provided by flanges 104a). Insertion body 102 includes an insertion end 106a, and a front end 106b. Isolator 100 is shown as further including a faceplate 108 attached to the front end 106b of insertion body 102. The faceplate 108 may be sized and shaped so as to be larger than the bore hole through the stud, so as to serve as a stop against the major planar face of the stud, when the insertion body is inserted into the bore hole through the stud during use. The faceplate 108 may further include one or more holes 110 therethrough, for receipt of nails 110a or other fasteners to secure the isolator 100 to the major planar face of the stud.

Insertion body 102 further includes a first hollow channel 112 for receipt of the plumbing pipe 14 to be protected and isolated, which extends through the bore hole through the stud. The illustrated embodiment of isolator 100 further includes a second hollow channel 114, concentric with and radially outside first hollow channel 112. Second channel 114 is configured to receive a curved metal nail protection collar 116, so as to surround the pipe 14, preventing puncture of the pipe, from a nail that may be driven through the minor face of the stud, after installation of the pipe and isolator. Advantageously, such nail protection is achieved without the need for any planar metal plate fastened over the minor face of the stud, as is conventionally done. Such plates require a separate step for installation, and result in an uneven surface along the minor face of the stud, resulting in bending of the sheetrock or other wallboard applied thereover. In addition, the configuration as described herein allows the sheetrock or other wallboard installer to use the entire face of the stud for fastening the sheetrock without risk of damaging pipe passing through a stud, making that construction process faster and easier. In addition, an owner or renter may use the entire stud surface for attachment (e.g., of pictures, TVs, wall hangings, etc.), without risk that a conventional metal plate will be hit at any given location, while at the same time providing full protection to the pipe running through such stud. Another benefit provided by eliminating the conventional metal stud plate is that in the event of a remodel, where new plumbing pipes are run, there is no need to tear out the drywall on the opposite wall face, to protect newly installed plumbing. Such requirement can be particularly costly and wasteful where the remodel does not otherwise affect the other side of the wall.

The isolator 100 shown in FIGS. 2A-2D further includes a plurality of flexible pipe engaging ribs 118 extending radially inward from the insertion body 102, into first hollow channel 112. Such ribs may be sized and configured in their flexibility to allow channel 112 to accommodate different diameters of plumbing pipe 14, so that ribs 118 engage and isolate pipe 14, whether such pipe is relatively larger, or smaller. For example, an exemplary isolator may accommodate both nominal ¾ inch pipe, as well as nominal ½ pipe (e.g., ½ inch or ¾ inch copper or PEX pipe). Those of skill in the art will appreciate that the nominal value (e.g., ½ or ¾ inch) refers to the nominal inside diameter of such pipe. Those of skill in the art will similarly appreciate that the values are nominal (named) values, and not necessarily exact. For example, a standard ½ inch PEX tubing has an inside diameter of about 0.485 inch, a wall thickness of about 0.07 inch, and an outside diameter of about 0.625 inch. A standard ¾ inch PEX tubing has an inside diameter of about 0.681 inch, a wall thickness of about 0.097 inch, and an outside diameter of about 0.875 inch. A standard ½ inch copper tubing has an inside diameter of about 0.569 inch, a wall thickness of about 0.028 inch, and an outside diameter of about 0.625 inch. A standard ¾ inch copper tubing has an inside diameter of about 0.811 inch, a wall thickness of about 0.032 inch, and an outside diameter of about 0.875 inch. The isolator may be configured to accommodate such sizes, or any other desired sizes. By way of example, when used with a ½ inch nominal sized pipe, ribs 118 may lightly engage with such a pipe, and when used with a ¾ inch nominal sized pipe, the ribs may bend or flex somewhat, to accommodate the larger sized pipe within channel 112. This ability to work with differently sized pipes is shown in FIGS. 4A-4C and 5A-5B. Suitable plastic materials for such flexing and bending may include various polyolefins (e.g., polyethylene, polypropylene, etc.), as well as a variety of other plastic materials that will be apparent to one of skill in the art, in light of the present disclosure.

As shown in FIGS. 3A-3D, in an embodiment, the isolator 100 may be configured to allow the user to easily visually verify that the nail protection collar is in place, even when the isolator is installed within the stud bore hole. This may be achieved by ensuring that the second channel 114 which receives the curved nail protection collar 116 is open at both the insertion end 106a and the front end 106b of insertion body 102. This allows the user or a building inspector to quickly verify that the nail protection collar is in fact installed correctly.

Figure 2A:
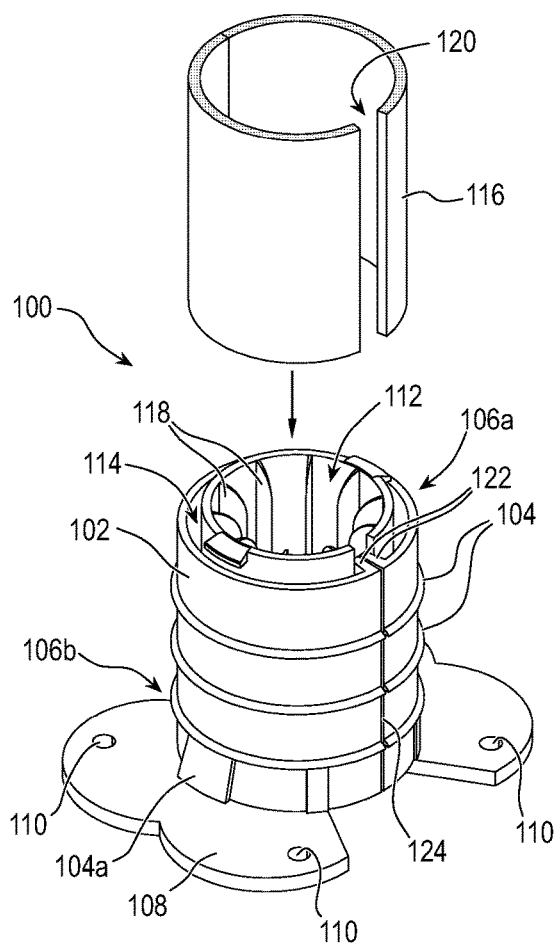
FIGS. 2A-2B show front and rear isometric views of an exemplary plumbing stud isolator with integrated nail protection according to an embodiment of the present invention, with the nail protection collar shown exploded from the insertion body.
Figure 2B:
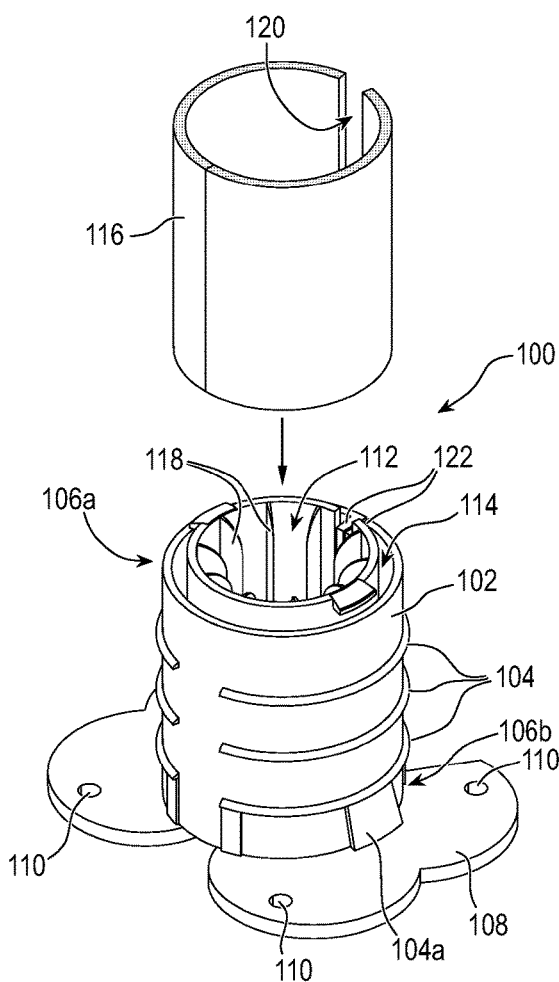
Figure 2C:
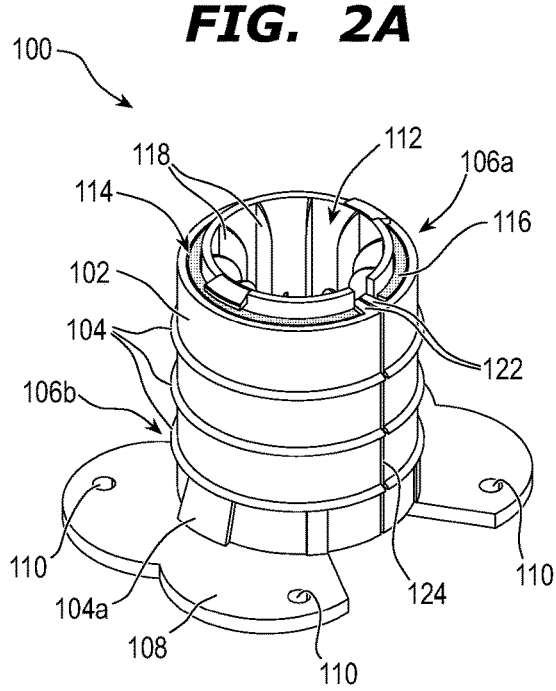
FIGS. 2C-2D show front and rear isometric views of the exemplary plumbing stud isolator with integrated nail protection of FIGS. 2A-2B, with the nail protection collar received into the insertion body.
Figure 2D:
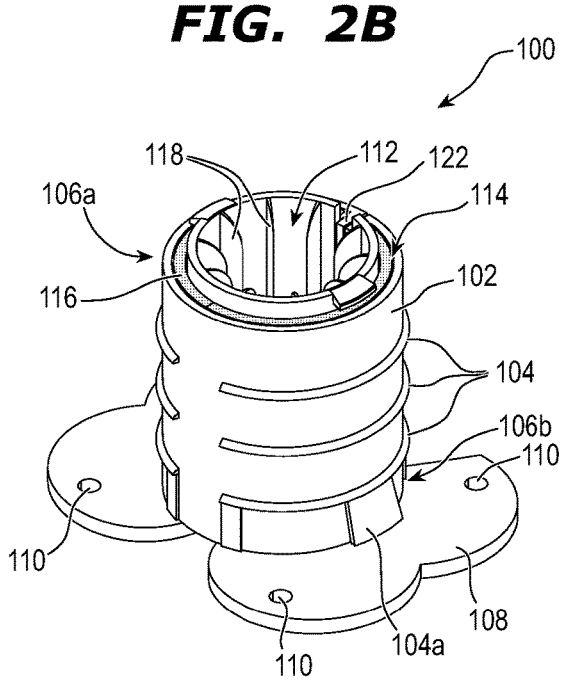
Figure 3A:
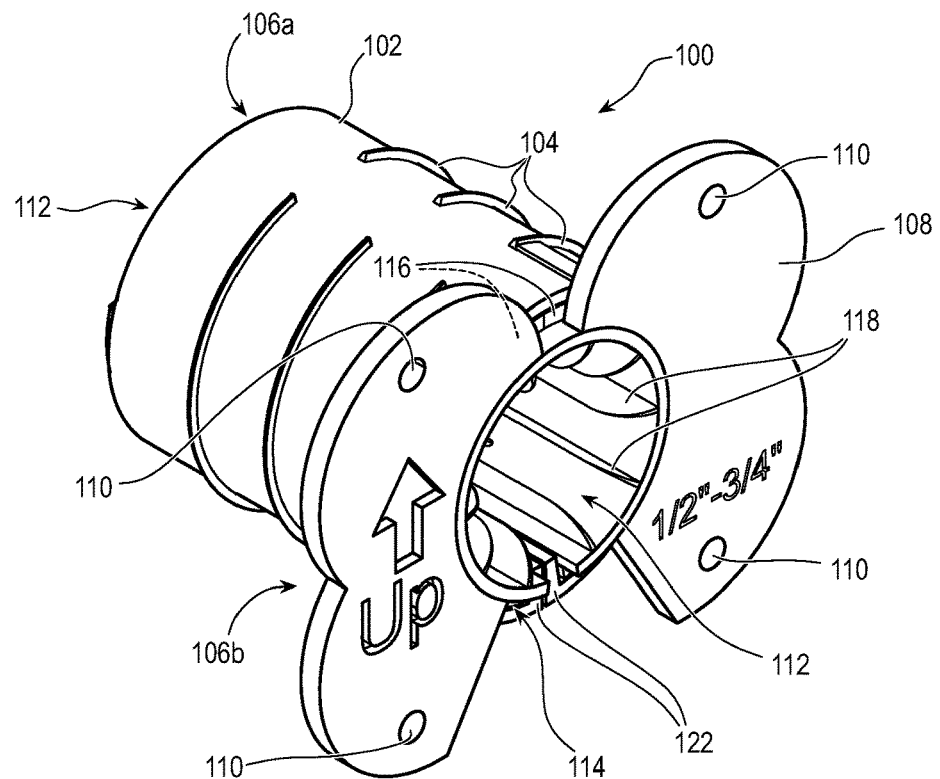
FIG. 3A-3F show additional isometric views of the isolator of FIGS. 2A-2B, ready for positioning over a plumbing pipe, and insertion into a bore hole through a stud.
Figure 3B:
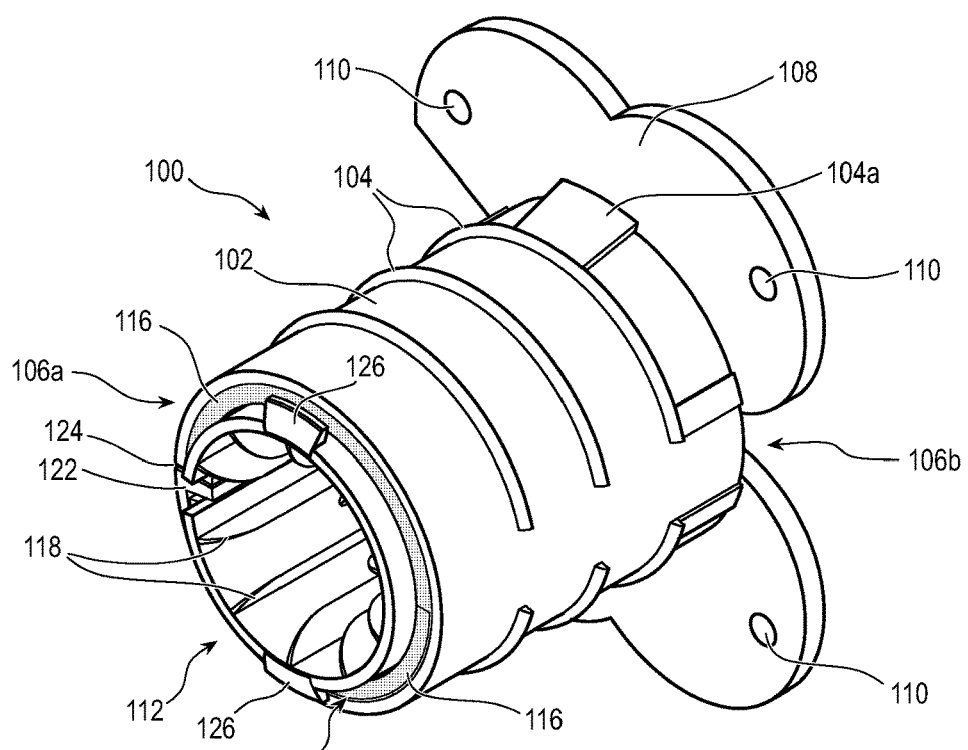
Figure 3C:
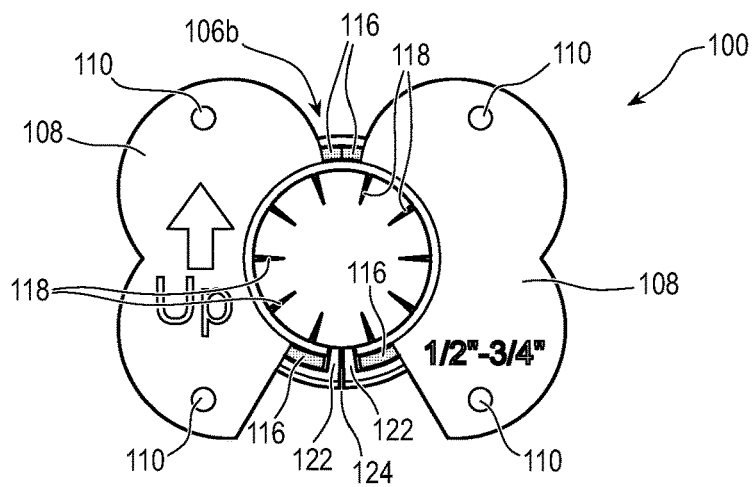
Figure 3D:
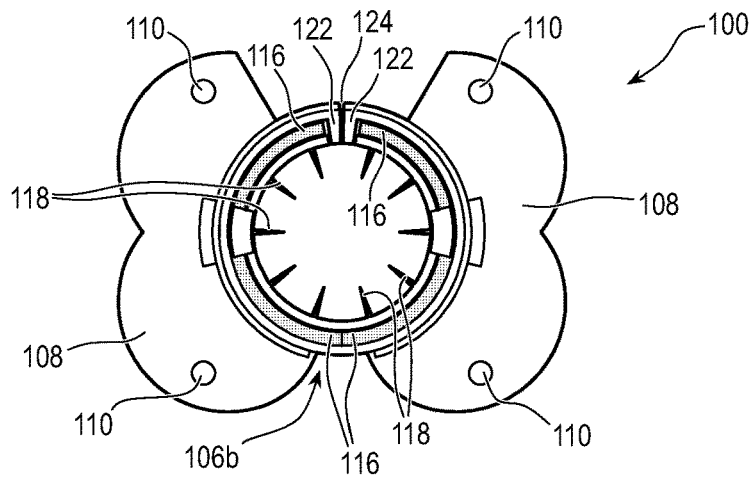
Figures 3E, 3F:
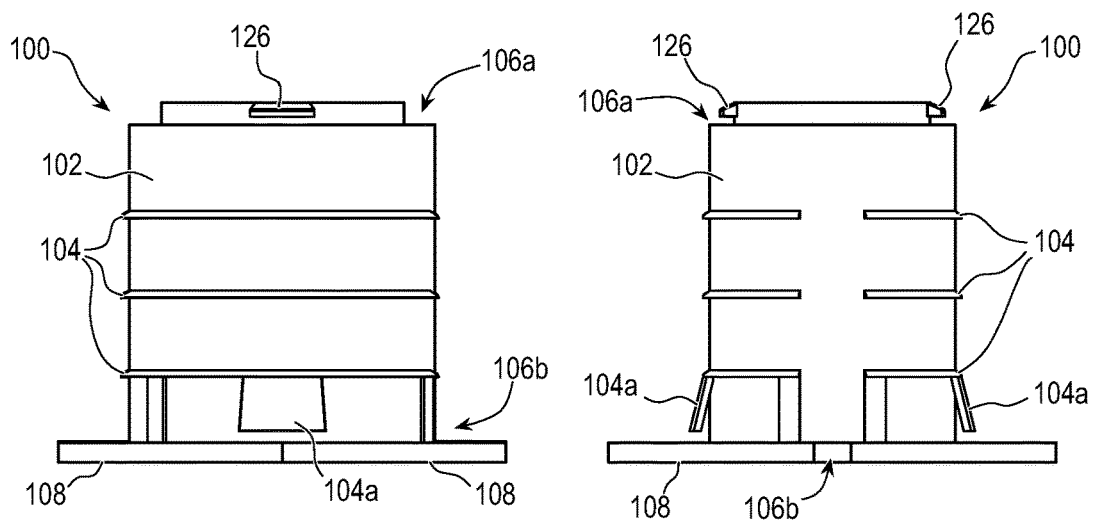

As shown in FIGS. 2A-2B, in an embodiment, the nail protection collar 116 may be configured as a plurality (e.g., two) of initially separate pieces, forming a "clamshell", where such pieces are inserted into second channel 114, as shown in FIGS. 2C-2D. As shown, the two separate pieces may be generally c-shaped in cross-section, so as to surround first channel 112 and the received plumbing pipe, during use. As shown, in an embodiment, the nail protection collar 116 may stop somewhat short of providing a full circular encompassing of the first channel 112. Such a gap 120 may accommodate, receive and mate with an inwardly oriented projection 122 of the insertion body 102, as shown. Projections 122 also correspond to an open seam 124 which allows the isolator 100 to "open up", or spread open, e.g., as shown in FIG. 4A, for easier placement of the isolator 100 over the plumbing pipe 14.

Insertion body 102 may include one or more flexible retention tabs 126 (e.g., perhaps best seen in FIG. 3B and the cross-sections of FIGS. 5A-5B) which help to secure nail protection collar 116 within second channel 114, once inserted. For example, the curved collar 116 (e.g., two c-shaped generally semicircular cross-section pieces) may be inserted into second channel 114 of insertion body 102 from the insertion end 106a, towards the front end 106b, until curved collar 116 reaches the rear of faceplate 108. Tabs 126 may flex to allow insertion into the channel, and once the collar 116 is fully inserted into channel 114, they may snap outward, so as to retain the nail protection collar 116 in place. Such assembly may typically be performed by the manufacturer prior to product sale, rather than by an end user.

Figure 4A:
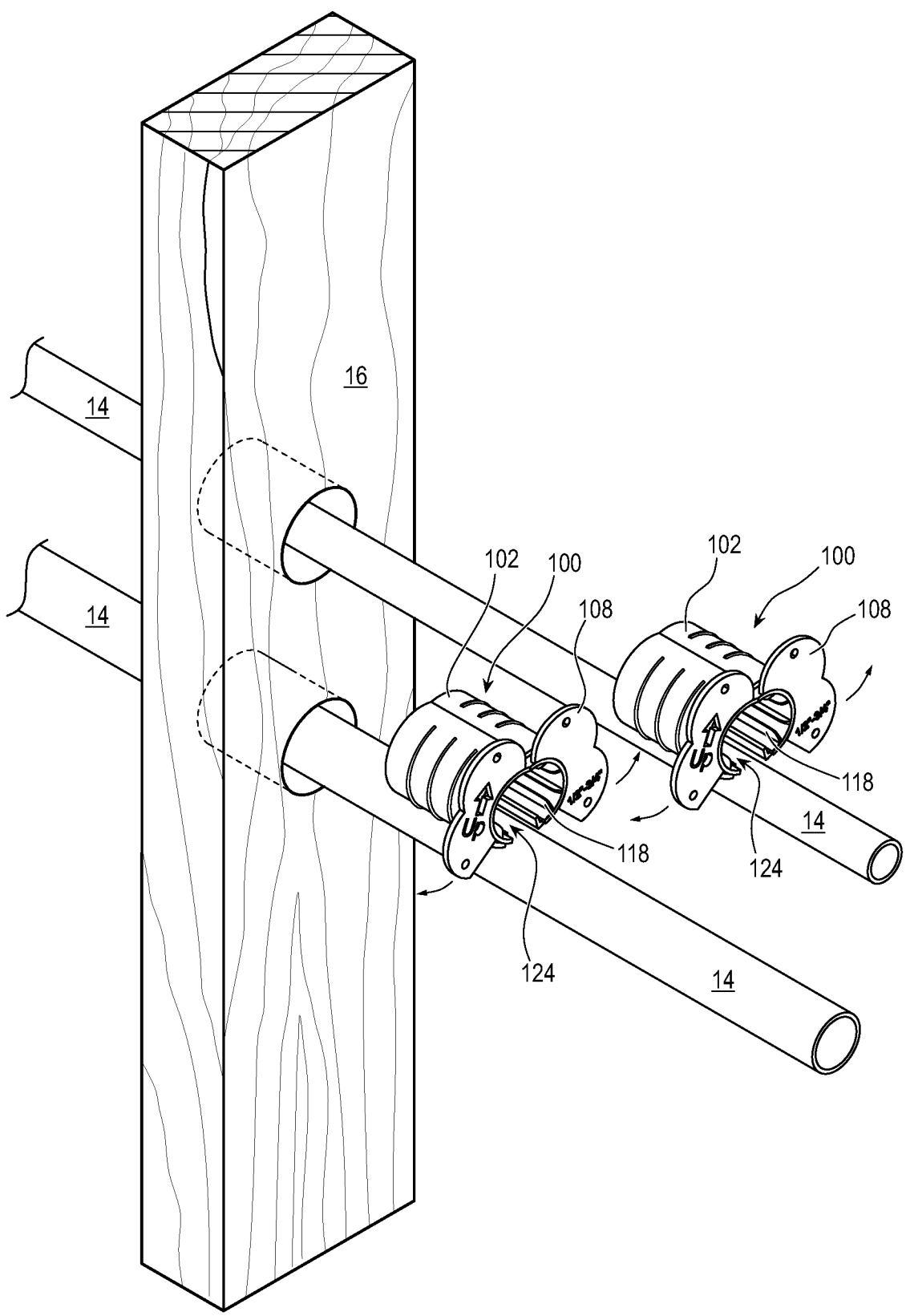
FIG. 4A shows isolators of FIGS. 3A-3F positioned adjacent to pipes to be protected, before the pipes are received within the first hollow channel of each isolator. Two different diameters of pipes are shown, showing how the same isolator can be used with differently sized pipes.
Figure 4B:
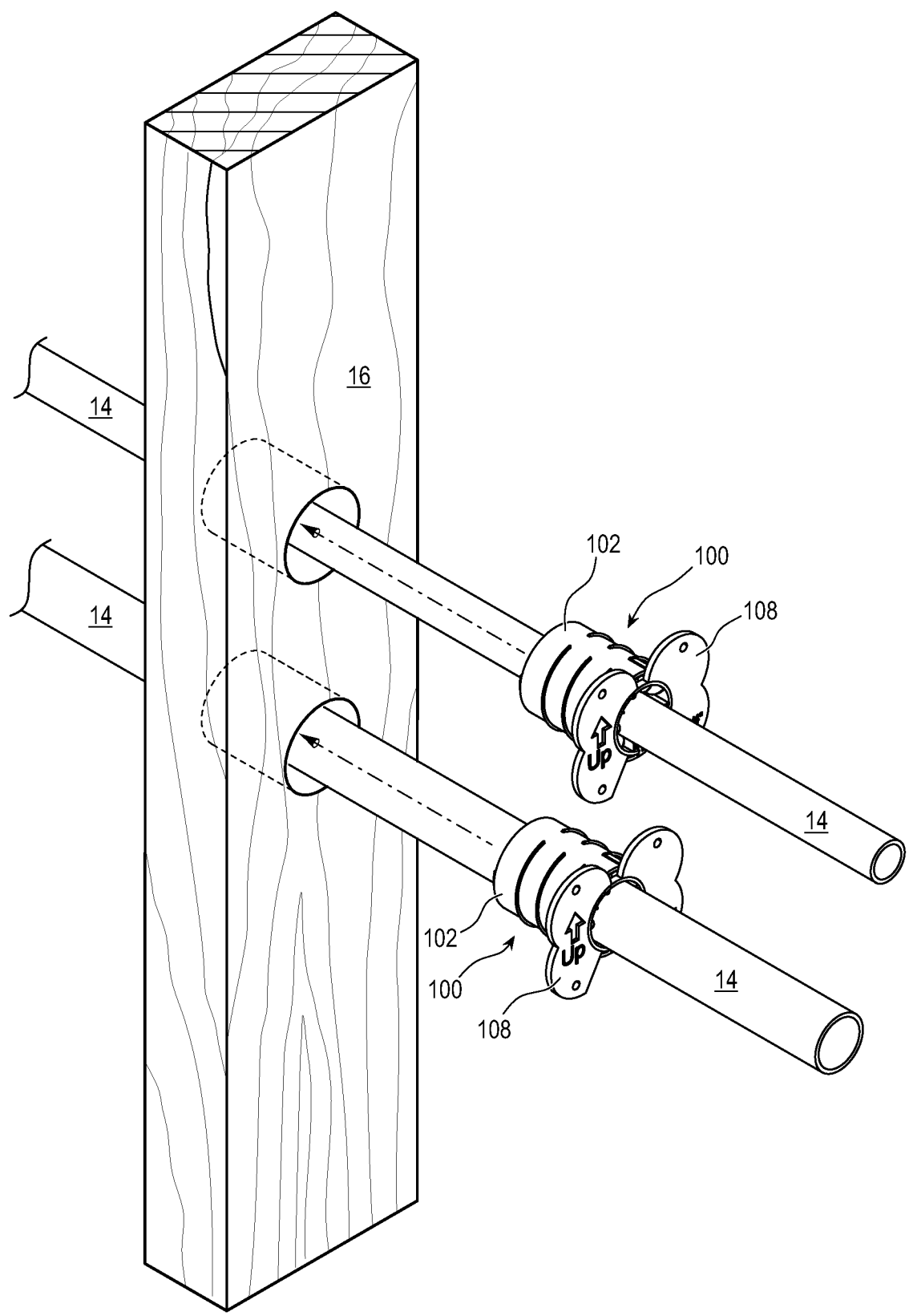
FIG. 4B shows the isolators and pipes of FIG. 4A, with the isolators positioned over the pipes, with the pipes to be protected received into the first hollow channel of each isolator, before the isolators have been slid into the stud bore hole.
Figure 4C:
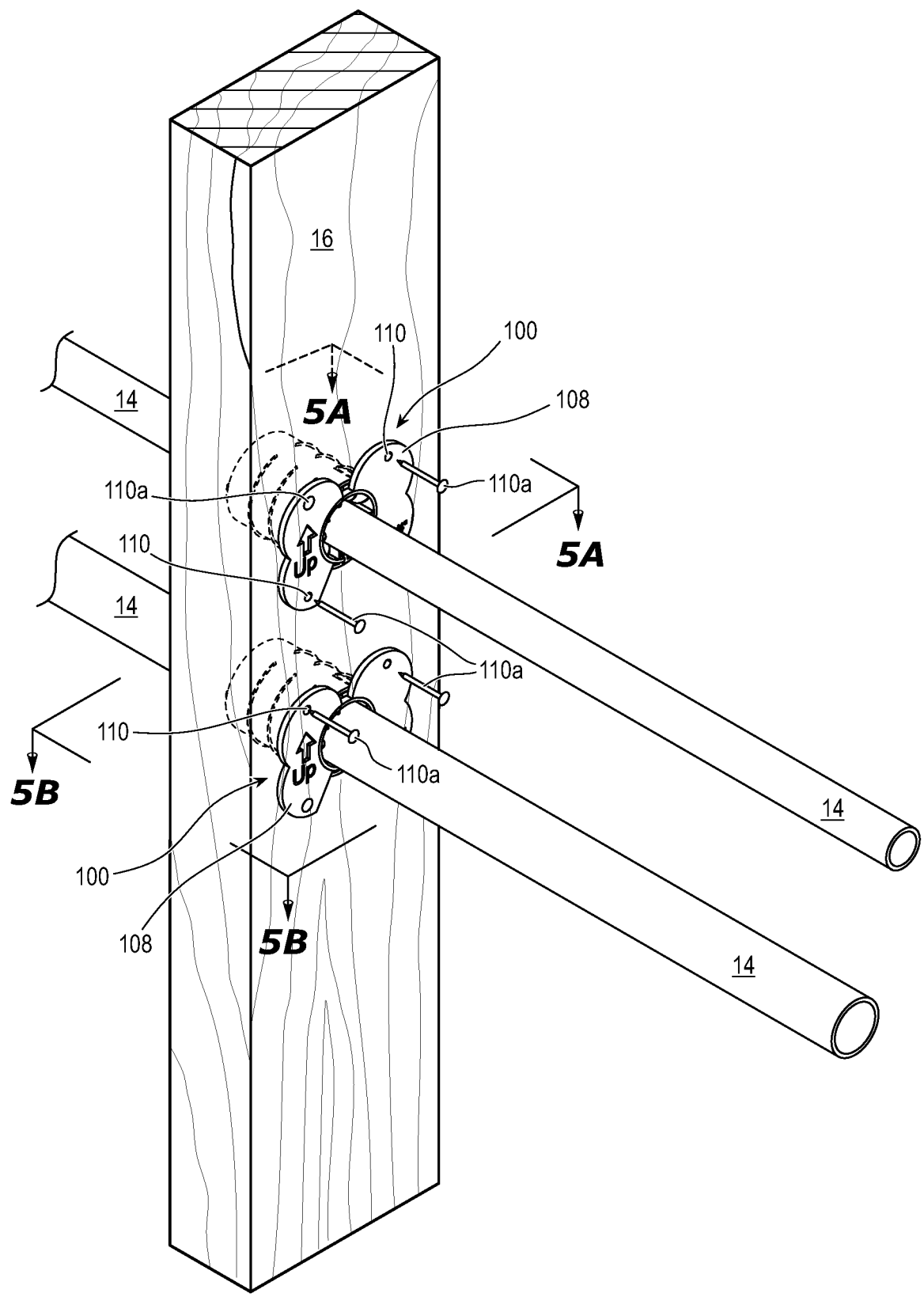
FIG. 4C shows the isolators and pipes of FIG. 4B, with the insertion body of each of the isolators inserted into the stud bore hole.
Figure 5A:
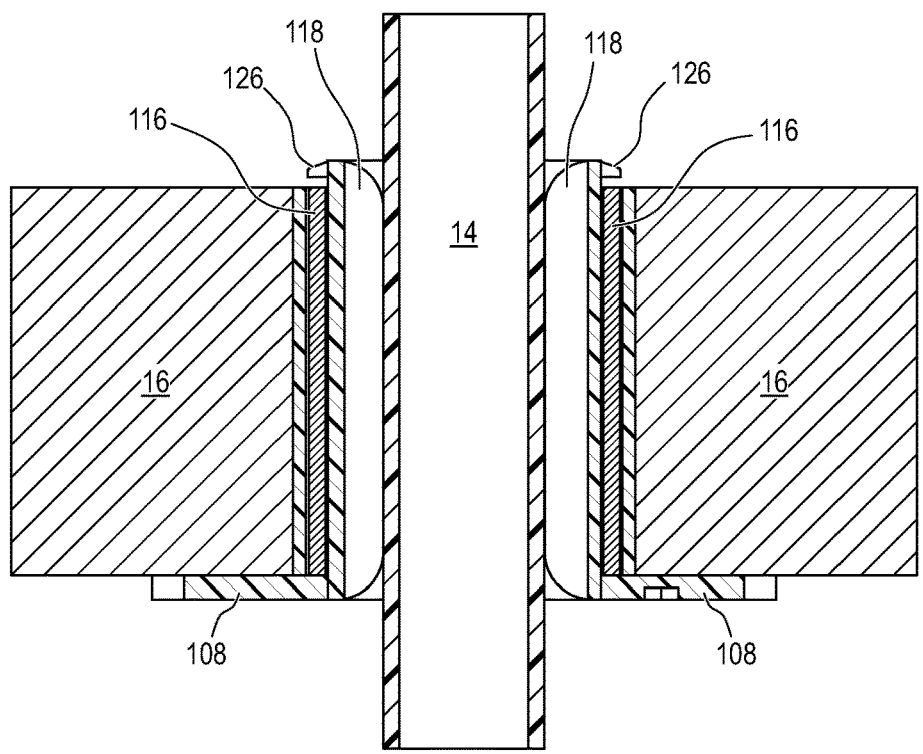
FIGS. 5A and 5B shows cross-sectional views through the installed isolators, showing how the internal ribs deflect out of the way, to accommodate a larger pipe (FIG. 5B), as compared to a smaller diameter pipe (FIG. 5A).
Figure 5B:
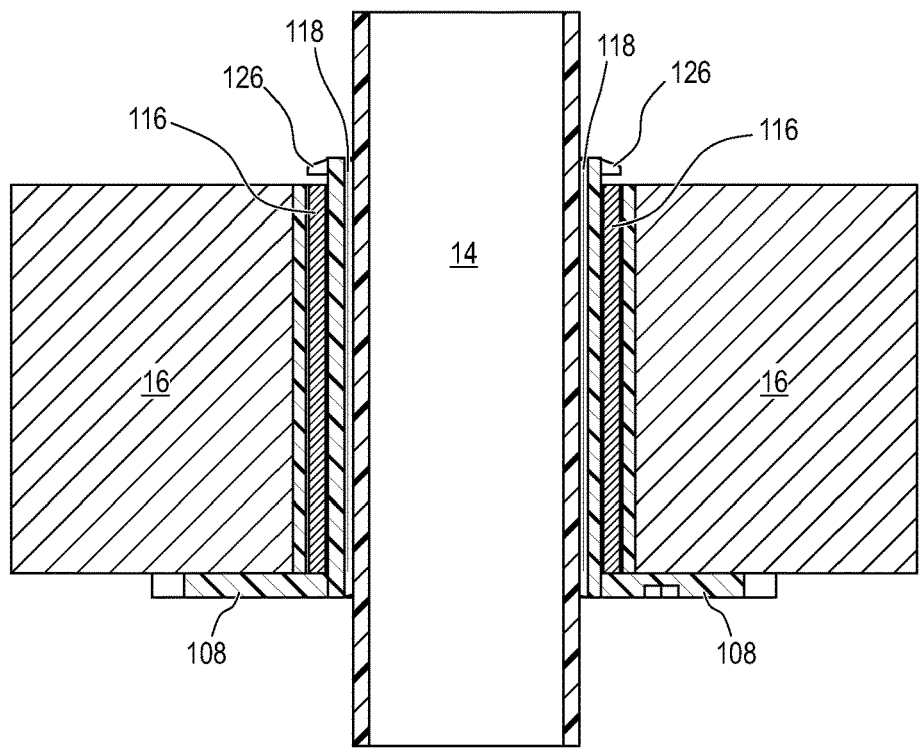

FIGS. 4A-4B illustrate how the isolator 100 may open up or spread open, about open seam 124, so as to allow the device 100 to be pressed over the pipe 14, even where the end of pipe 14 is not accessible. Where the pipe end is accessible, the device 100 can alternatively simply be slid over the end of the pipe, as will be apparent. As shown in FIG. 4B, once the pipe 14 is received within first channel 112, the device may be closed about open seam 124, and then the insertion body portion 102 of the device can be slid into the stud bore hole, as shown in FIG. 4C. FIGS. 4A-4C further illustrate how the same device 100 can be used with differently sized plumbing pipes 14, e.g., such as, but not limited to nominal ½ inch and ¾ inch sizes. FIGS. 5A-5B illustrate cross-sectional views through such configurations, showing how when used with the larger diameter pipe (FIG. 5B), the flexible ribs 118 are able to flex laterally, so as to accommodate the larger pipe diameter. As shown in FIG. 5A, where a smaller diameter pipe is received in channel 112, the ribs 118 may exhibit less (and perhaps little if any) deflection than exhibited in FIG. 5B. By way of example, FIG. 5A may illustrate receipt of a nominal ½ inch plumbing pipe, while FIG. 5B may illustrate receipt of a nominal ¾ inch plumbing pipe.

Figure 6A:
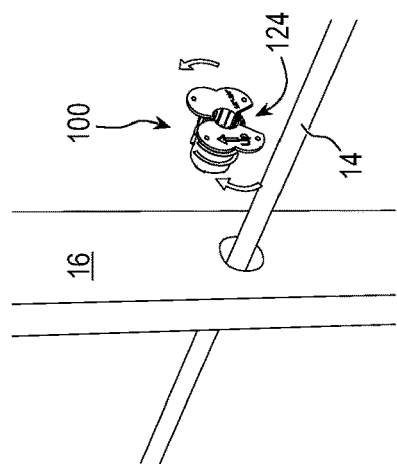
FIGS. 6A-6H sequentially show exemplary steps associated with installation of the isolator seen in FIGS. 2A-3F.
Figure 6B:
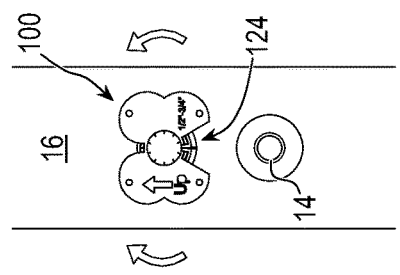
Figure 6C:
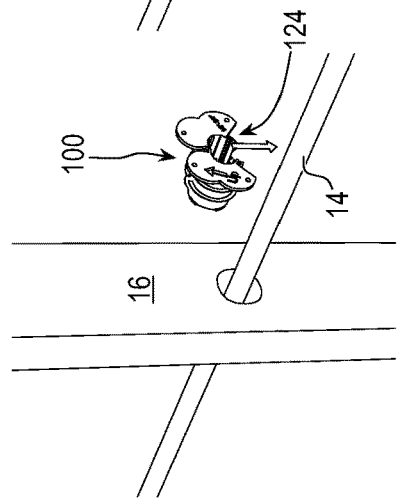
Figure 6D:
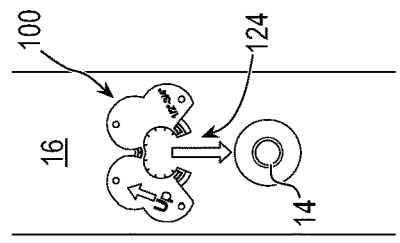
Figure 6E:
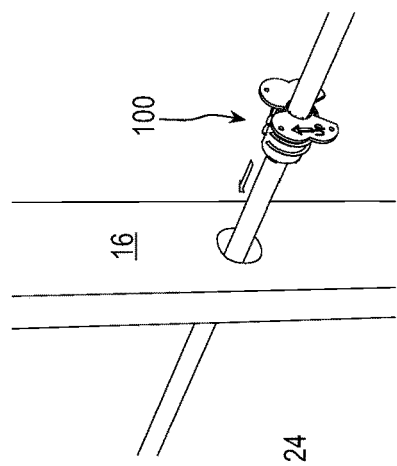
Figure 6F:
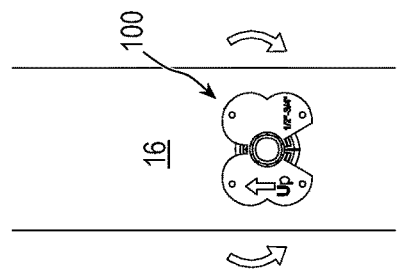
Figure 6G:
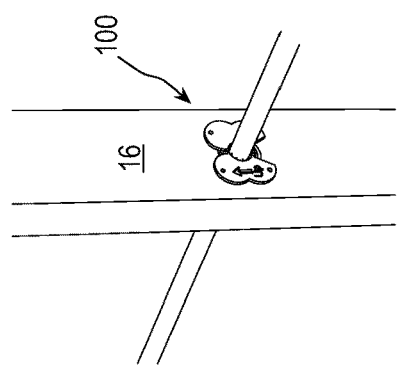
Figure 6H:
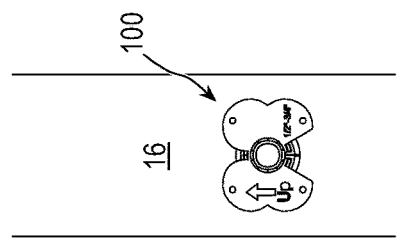
Figure 8A:
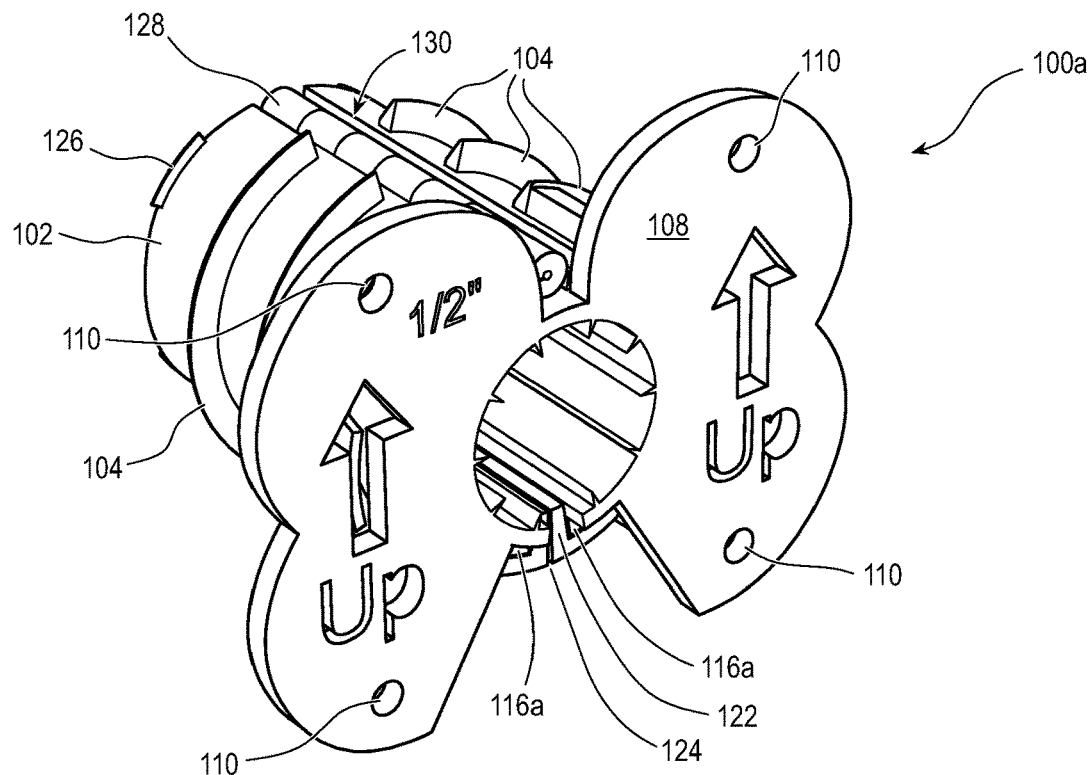
Figure 8B:
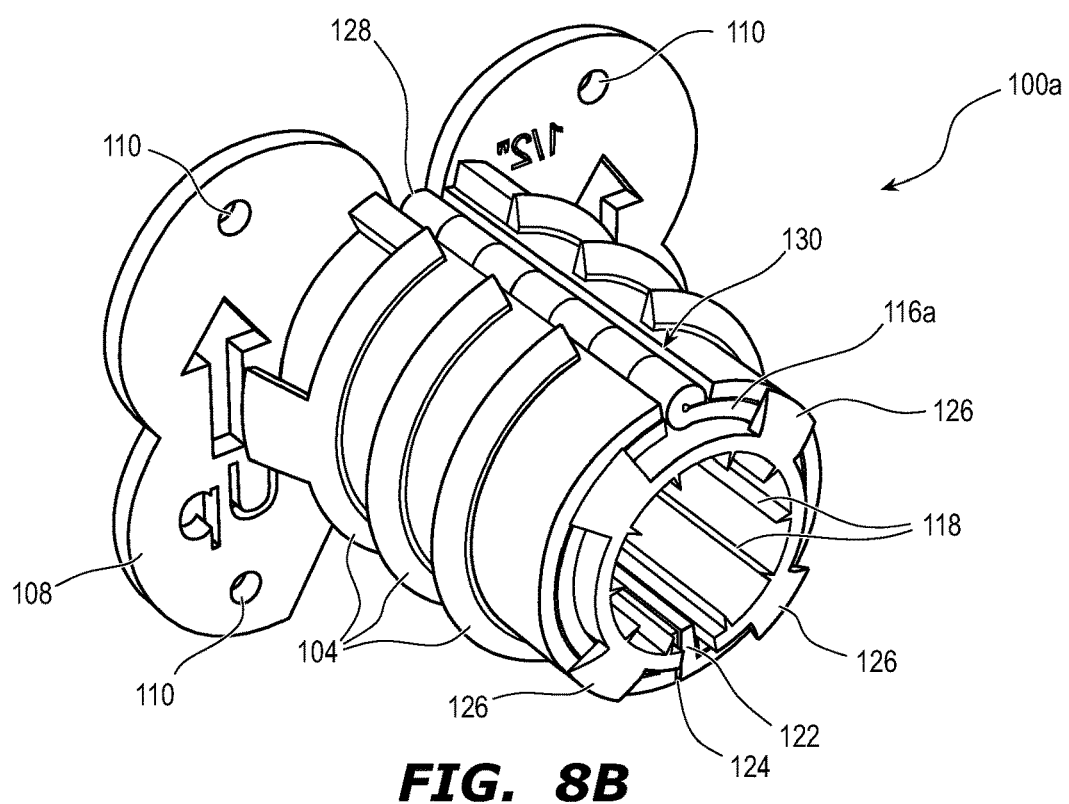

FIGS. 6A-6H illustrate exemplary step by step instructions for how the device 100 may be installed. For example, FIGS. 6A-6D illustrate the device 100 being spread to an open position about seam 124, to facilitate pressing the open device over the pipe 14. When in the open position as shown in FIGS. 6C and 6D, the device 100 can be pressed downward, to position it over the pipe 14, as shown in FIGS. 6E-6F. Once in position over the pipe, the insertion body 102 may then be pressed into the bore hole through the stud 16, to push the faceplate 108 against the stud face, as shown in FIGS. 6G-6H. Prototypes of such a "clamshell" embodiment have been tested at IAPMO (International Association of Plumbing & Mechanical Officials) lab and passed the relevant UPC requirements.

FIGS. 7A-8G illustrate another embodiment of an isolator 100a, similar to that shown in FIGS. 2A-6H, but where the nail protection collar is differently configured. In the embodiment shown in FIGS. 7A-8G, nail protection collar 116a includes a similar circular cross-sectional shape, but includes a hinge 128, rather than being provided as two separate "clamshell" pieces. In addition, the insertion body 102 of isolator 100a includes a gap 130 (e.g., positioned along the top) for receipt of the hinge 128. In an embodiment, gap 130 may be positioned opposite of (e.g., 180° from) open seam 124, as shown. Device 100a may function in essentially the same way as described relative to the "clamshell" embodiment described in conjunction with FIGS. 2A-6H.

Figure 9G:
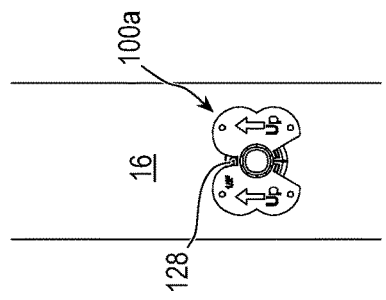
FIGS. 9A-9H sequentially show exemplary steps associated with installation of the isolator seen in FIGS. 7A-8G.
Figure 9A:
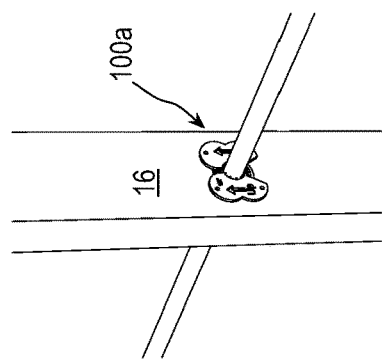
Figure 9C:
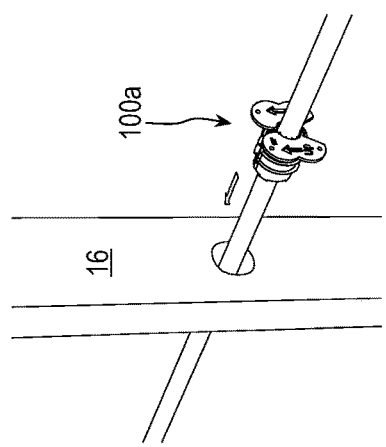
Figure 9E:
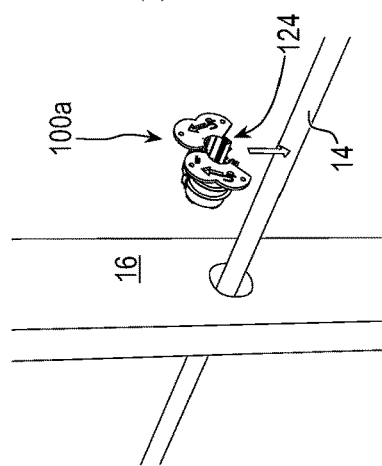
Figure 9H:
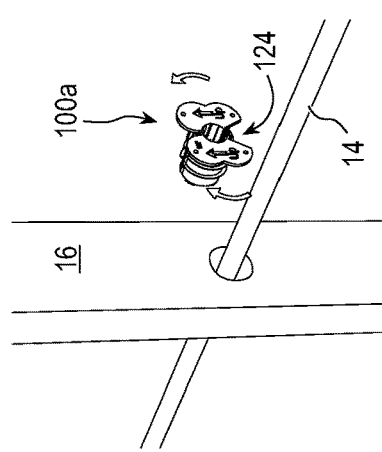
Figure 9F:
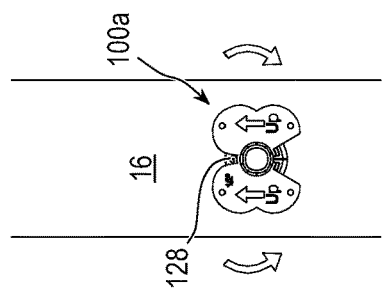
Figure 9D:
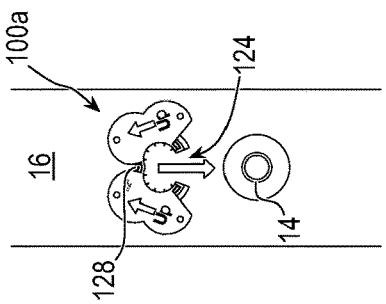
Figure 9B:
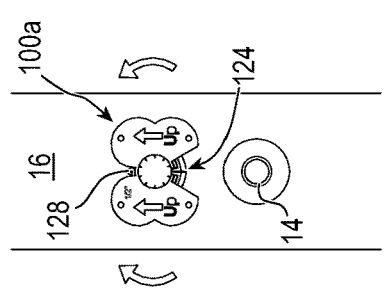
Figure 10A:
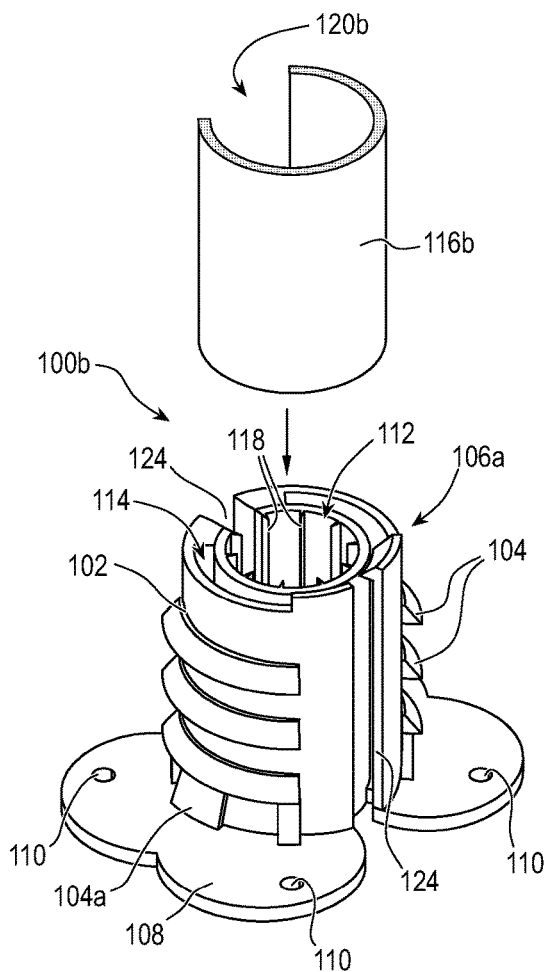
FIGS. 10A-10B show front and rear isometric views of another exemplary plumbing stud isolator (e.g., a fixed metal collar configuration) with integrated nail protection according to an embodiment of the present invention, with the fixed metal collar nail protection collar shown exploded from the insertion body.
Figure 10B:
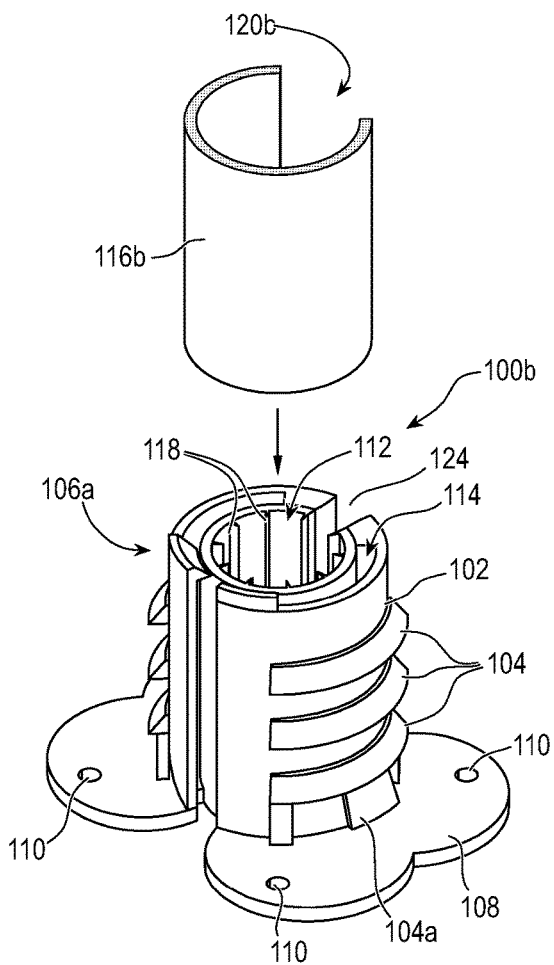
Figure 10C:
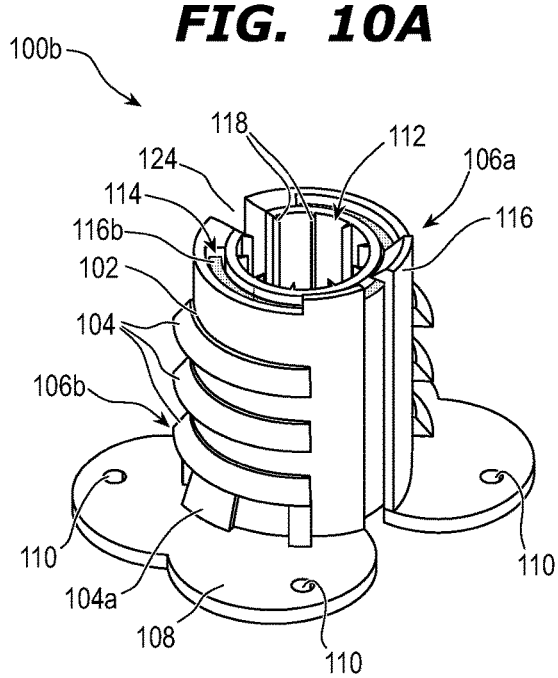
FIGS. 10C-10D show front and rear isometric views of the exemplary plumbing stud isolator with integrated nail protection of FIGS. 10A-10B, with the fixed metal collar nail protection collar received into the insertion body.
Figure 10D:
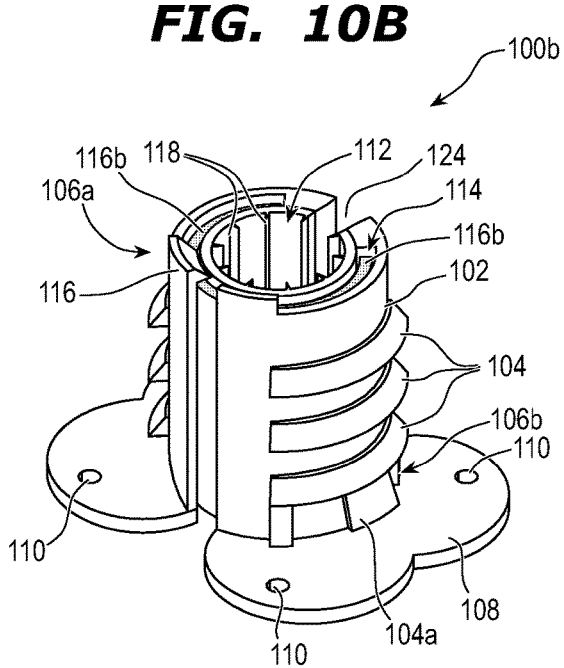
Figure 11A:
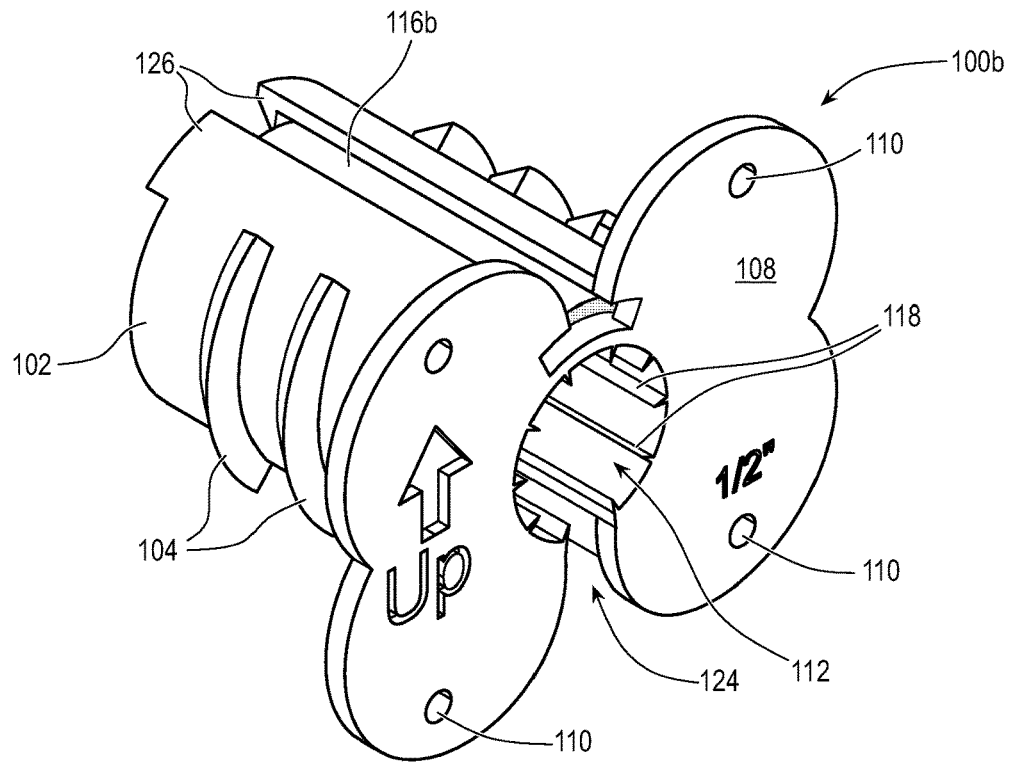
FIG. 11A-11G show additional isometric views of the isolator of FIGS. 10A-10B, with the fixed metal collar nail protection collar shown received into the insertion body.
Figure 11B:
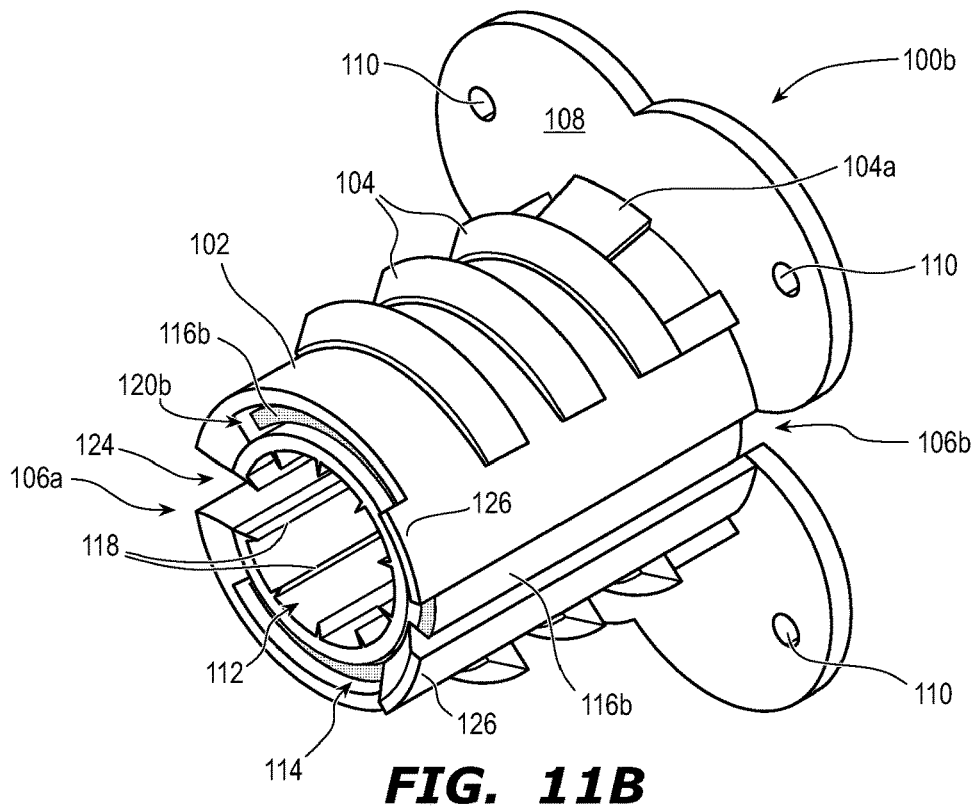
Figure 11C:
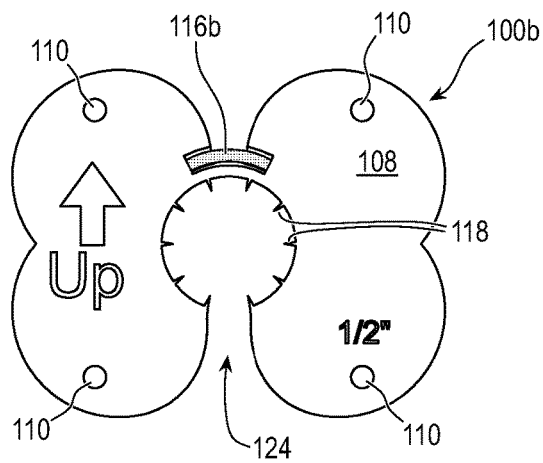
Figure 11D:
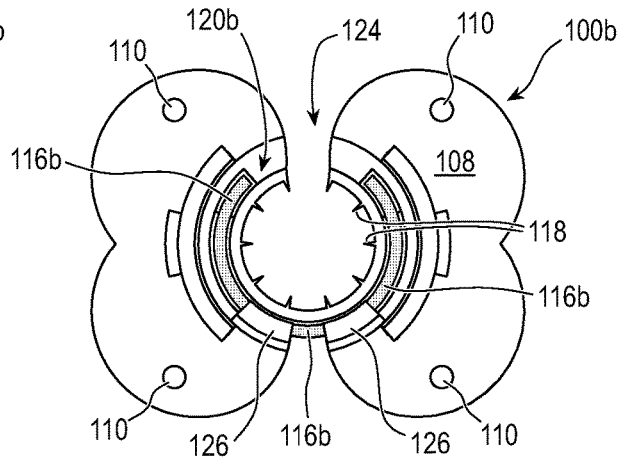
Figure 11E:
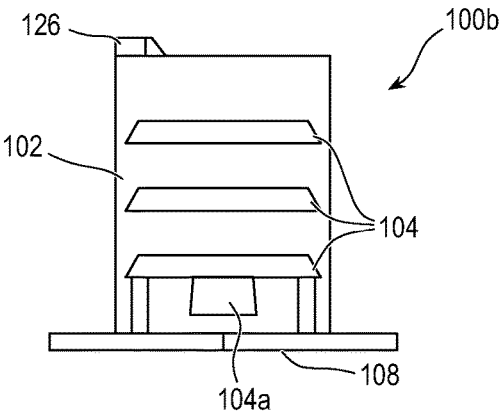
Figure 11F:
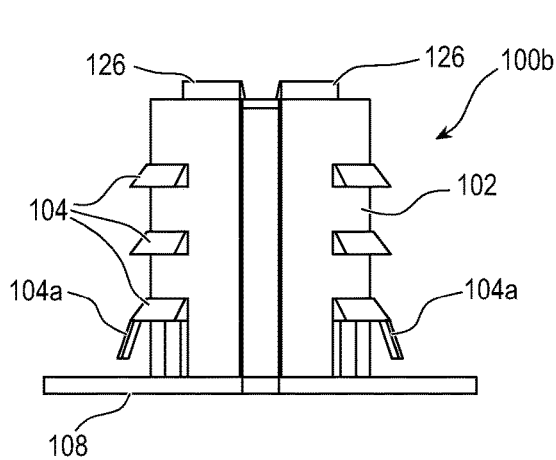
Figure 11G:
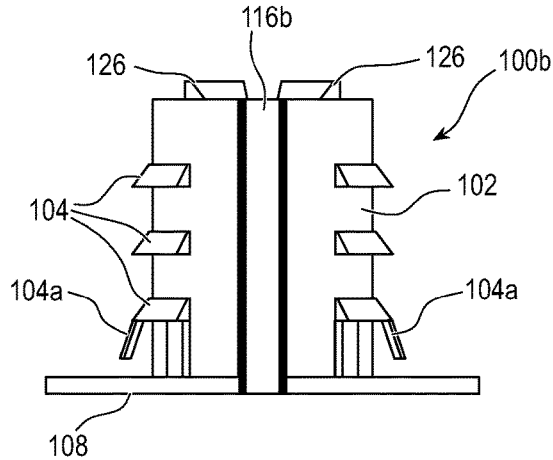
Figure 14A:
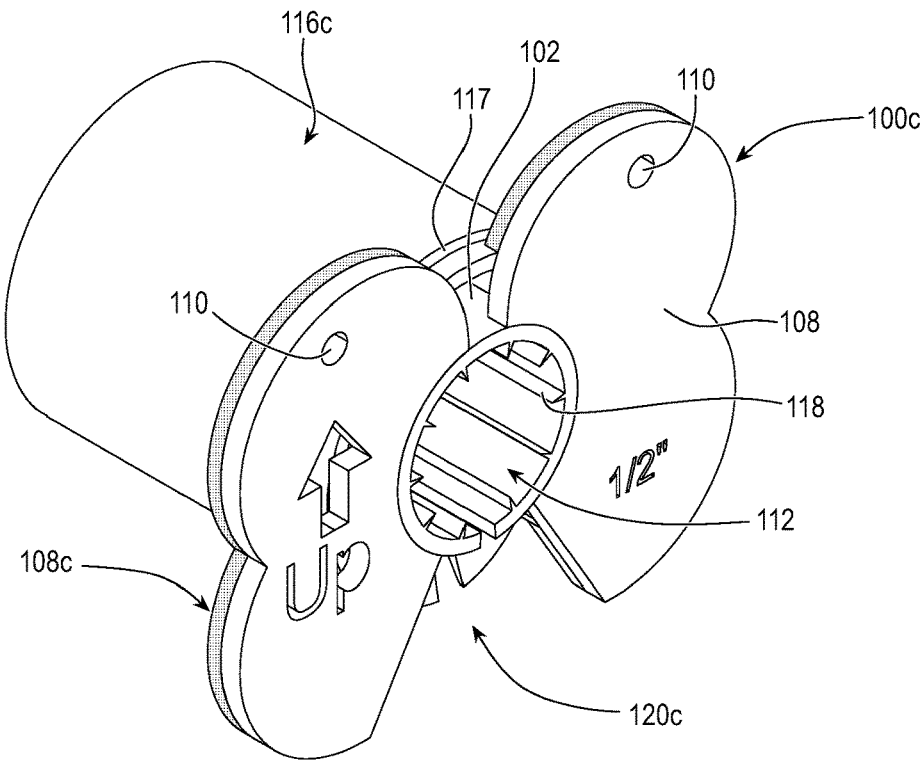
FIG. 14A-14G show additional isometric views of the isolator of FIGS. 13A-13B, with the plastic insertion body received into the boring liner nail protection member.
Figure 14B:
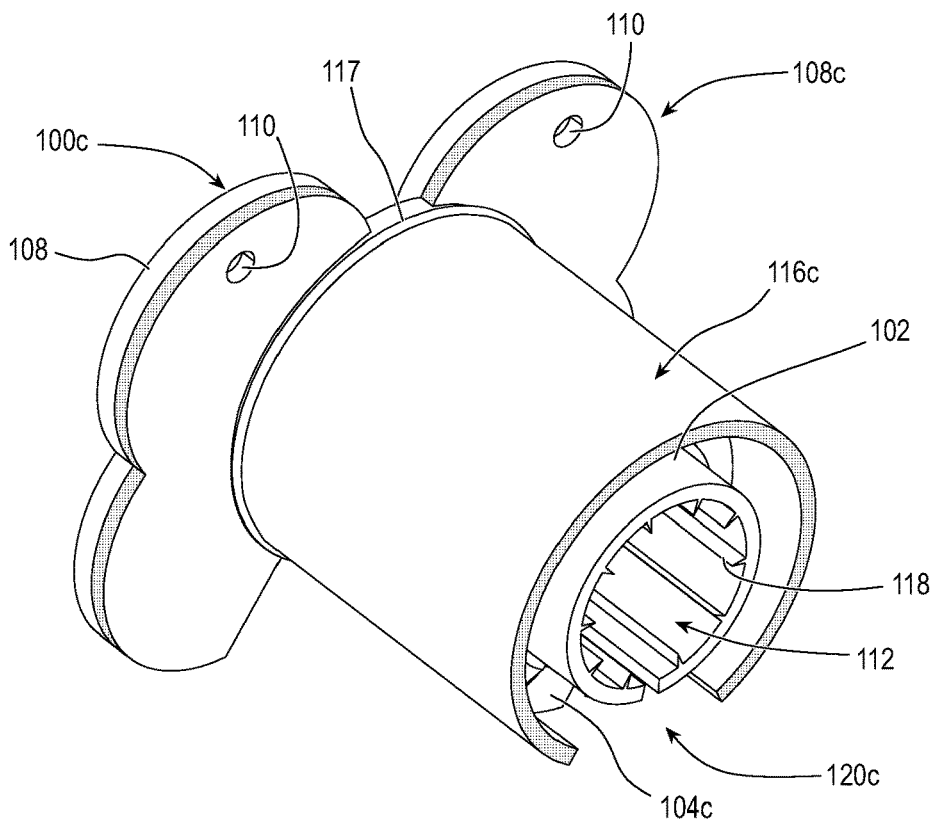
Figure 14C:
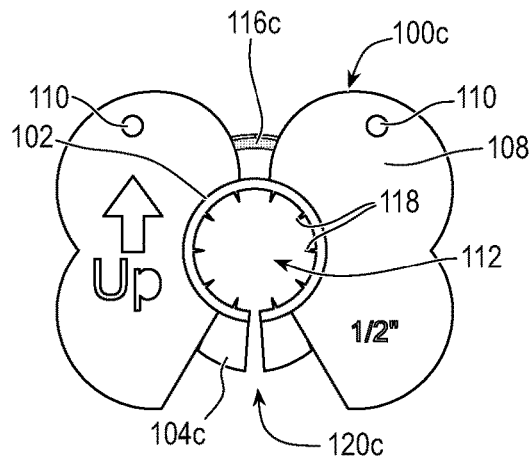
Figure 14D:
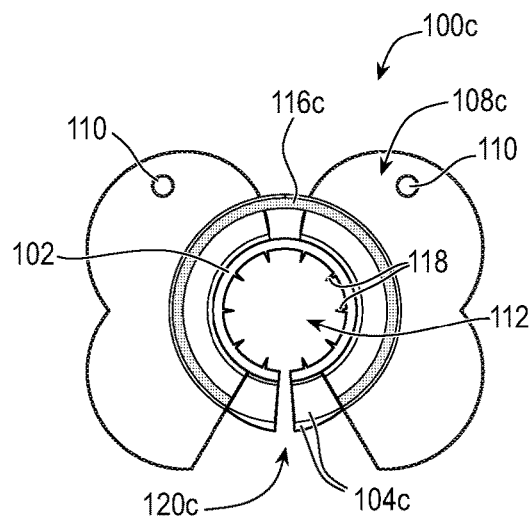
Figure 14E:
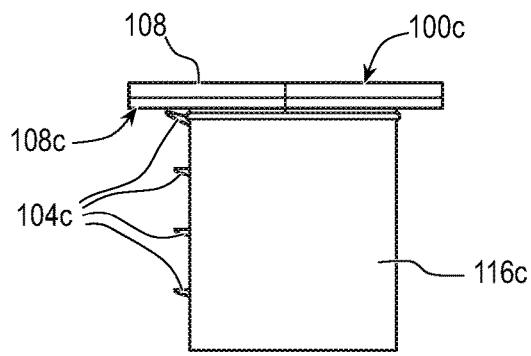
Figure 14F:
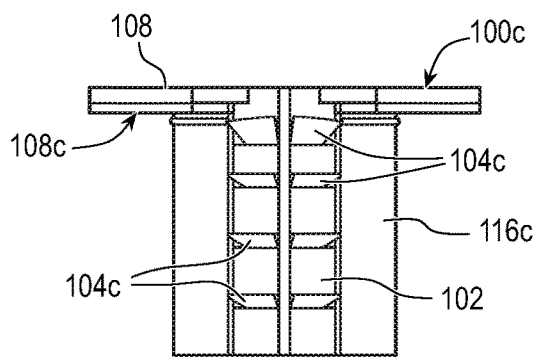
Figure 14G:
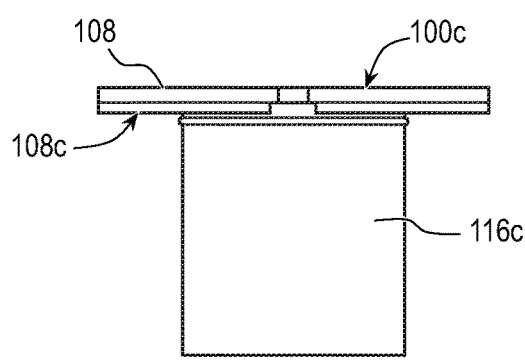

FIGS. 9A-9H illustrate exemplary step by step instructions for how the hinged configuration 100a may be installed. For example, FIGS. 9A-9D illustrate the device 100a being spread to an open position about seam 124, to facilitate pressing the open device over the pipe 14. When in the open position as shown in FIGS. 9C and 9D, the device 100a can be pressed downward, to position it over the pipe 14, as shown in FIGS. 9E-9F. Once in position over the pipe, the insertion body 102 may then be pressed into the bore hole through the stud 16, to push the faceplate 108 against the stud face, as shown in FIGS. 9G-9H.

FIGS. 10A-12G illustrate another embodiment of an isolator 100b, similar to that shown in FIGS. 2A-6H, but where the nail protection collar is differently configured. In the embodiment shown in FIGS. 10A-12G, nail protection collar 116b includes a similar curved cross-sectional shape, but is formed as a single piece, and includes a significantly larger opening or gap 120b adjacent the bottom of the curved nail protection collar 116b. For example, gap 120b may define an arc length of about 90°, such as from 70° to 110°, or 80° to 100°. The channel 114 which receives curved collar 116b is keyed to collar 116b, to ensure that it can be inserted in only the desired orientation, with gap 120b oriented towards the bottom of isolator 100b. While no nail protection may be provided at the location of gap 120b, by ensuring that this gap 120b is positioned downwards, there is little if any risk of puncture to pipe 14 as any nails being driven into stud 16 would come from the lateral sides, not from the top or bottom.

In addition, because curved nail protection collar 116b is formed as a single piece of metal, rather than the two-piece clamshell or hinged configurations described previously, the isolator 100b may exhibit less ability to spread open along open seam 124, as compared to the other embodiments. Because of this difference, this embodiment of the nail protection collar may be referred to as a fixed metal collar. As shown in FIGS. 12A-12H, the installation process may be similar to that described for the other embodiments. The fixed metal collar 116b may come pre-assembled with the plastic portion of the isolator 100b. This assembly may be pressed over pipe 14, with the gap 120b oriented down, and with the isolator 100b spread open along open seam 124, as shown. The fully assembled isolator 100b may be slid into the stud bore hole, as shown in FIGS. 12G-12H. It will be appreciated that the illustrated method of installation is merely exemplary, and other installation steps and methods are of course possible. For example, as with the clamshell and hinged nail protection collar embodiments, the isolator 100*b* can be slid directly over the end of the length of pipe 14, and then inserted into the stud bore hole, if the end of the pipe 14 is accessible.

FIGS. 13A-14G illustrate another embodiment of an isolator 100*c*. In the embodiment shown in FIGS. 13A-14G, nail protection is provided by a nail protection member 116*c* that may be referred to as a "boring liner". This embodiment differs from those shown previously, in that the boring liner 116*c* is not received into a channel within the insertion body of the isolator, but the insertion body 102 is instead received into the boring liner portion of the nail protection member 116*c*. As shown in FIGS. 13A-14G, such a boring liner isolator 100*c* may include a similar insertion body 102 as described relative to the other embodiments, where the insertion body includes a periphery (e.g., ridges 104) that extend outward towards the edge of the bore hole through the stud, where the insertion body similarly includes an insertion end 106*a* and a front end 106*b*, as described previously. As with the other embodiments, a faceplate 108 is provided attached to the front end 106*b* of the insertion body 102, where the faceplate 108 is sized and shaped larger than the bore hole through the stud. The insertion body 102 includes a hollow channel 112 as the other embodiments, for receipt of pipe 14, but no second channel 114 need be provided. Rather, nail protection is provided by a metal nail protection member (e.g., referred to as the boring liner) 116*c*, that also includes or is attached to a boring liner faceplace 108*c*. The boring liner 116*c* engages with the edges of the bore hole through the stud (similar to how the insertion body engages with such edges in the other described embodiments). In this configuration, the generally cylindrical nail protection portion of the boring liner surrounds the insertion body 102, and the boring liner faceplate 108*c* is aligned with the faceplate 108 attached to the front end 106*b* of the insertion body 102. In such a manner, the curved "collar" portion of the boring liner is able to protect the plumbing pipe 14 within the bore hole through the stud.

Similar to gap 120*b* of embodiment 100*b*, boring liner 116*c* is shown as include a gap 120*c*. Gap 120*c* may similarly define an arc length of about 90°, such as from 70° to 110°, or 80° to 100°. While no nail protection may be provided at the location of gap 120*b*, by ensuring that this gap 120*b* is positioned downwards, there is little if any risk of puncture to pipe 14 as any nails being driven into stud 16 would come from the lateral sides, not from the top or bottom. Insertion body 102 may include one or more radially larger ribs 104*c*, which extend radially outward, through gap 120*c*, as shown in FIGS. 13A and 13C. This may aid in ensuring that the gap 120*c* is oriented downward, to minimize any risk of undesired nail penetration.

The boring liner 116*c* may include a radially extending bead 117 adjacent the boring liner faceplate 108*c*, to aid in securing the boring liner in the stud.

FIGS. 15A-15H illustrate exemplary steps for installation of such an embodiment including a boring liner. For example, as shown in FIGS. 15A-15B, the boring liner 116*c* may be pressed over pipe 14, with the gap 120*c* oriented down, and pressed into the stud bore hole. The plastic portion of isolator 100*c* (separate from the metal boring liner 116*c*) may be spread open along open seam 124, and pressed over the pipe 14, as shown in FIGS. 15C-15D. The insertion body 102 and faceplate 108 of the plastic portion of isolator 108*c* may then be closed, and pressed into the metal boring liner 116*c*, as indicated by the arrow in FIG. 15E. Such an embodiment similarly provides nail protection, and isolation to the pipe, without the need to install any separate planar nail plate on the minor face of the stud. It will be appreciated that the illustrated method of installation is merely exemplary, and other installation steps and methods are of course possible. For example, as with any of the other embodiments, where the end of pipe 14 is accessible, the boring liner and plastic portion of the isolator can simply be slid directly over the end of the length of pipe 14, and then inserted into the stud bore hole.

The nail protection portion of the isolator (e.g., the metal collar) may be formed from any suitable material that meets the UPC requirements. An example of such is 16 gauge galvanized steel, although of course other materials (and thicknesses thereof) meeting the requirements are also possible. It will be appreciated that various other materials may also be used, so long as they meet the code requirements. The remainder of the isolator may be formed from any suitable plastic material, e.g., including, but not limited to polyethylene, polypropylene, other polyolefins, ABS, PET, or numerous other possible plastic materials. While plastic is a particular suitable material, it will be appreciated that use of other materials may also be possible.

Any of the various described embodiments may be inserted around the pipe and can be adjusted in location before insertion into the stud. Additionally, with any of the various embodiments, the pipe may be repositioned within the stud wall even after the isolator is installed around the pipe and inserted into the stud.

In addition, any of the various described embodiments may be removed from the stud once inserted and then reinserted as needed in that or any other location.

In addition to the various noted benefits provided by the present devices, the devices also reduce the amount of metal needed to meet UPC code requirements, because the metal used to form the metal collar uses less metal than required in current conventional stud plates. For example, the present embodiments may require approximately 66% less metal, reducing manufacturing costs, and reducing freight volume by approximately 33%, and reducing freight weight by approximately 75% as compared to current solutions. The reduced mass and volume offers savings at all legs of the supply chain freight and storage, including but not limited to raw material and energy used in manufacture, shipment from manufacturer to wholesaler, wholesaler to distributor, distributor to customer, and customer to job site. The present devices also eliminate an entire SKU while still meeting the same code requirements. The present devices also save time during installation, as the present isolators providing combined isolation and nail protection can be installed in essentially the same method as existing stud isolators, without the need for any new or additional tools or processes. The present integrated devices will also eliminate incidence of failed building inspections, due to a missing nail plate, a common mistake made by installers because of the separate products and steps needed when using existing products that are not integrated as provided by the present invention. The present devices provide improved results or performance as they eliminate sheetrock distortion, making mudding/taping faster and simpler (as there are no underlying nail plates). The present devices also allow for uninterrupted use of stud surfaces for nail fastening, as there are no underlying traditional nail plates. Additionally, it ensures that one need only remove one side of drywall or gypsum wall board on renovations to provide nail protection on interior walls (the methods, devices and systems do not require access to both wall surfaces in case of a remodel, etc.)

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition.

As used herein, the term "between" includes any referenced endpoints. For example, "between 2 and 10" includes both 2 and 10.

It must be noted that, as used in this specification and the appended claims, the singular forms "a," "an" and "the" include plural referents unless the content clearly dictates otherwise.

Unless otherwise stated, all percentages, ratios, parts, and amounts used and described herein are by weight.

Some ranges may be disclosed herein. Additional ranges may be defined between any values disclosed herein as being exemplary of a particular parameter. All such ranges are contemplated and within the scope of the present disclosure.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

Disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure. Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A plumbing stud isolator with integrated nail protection comprising:
    an insertion body sized and configured for insertion into a bore hole through a stud, wherein the insertion body includes a periphery that engages with edges of the bore hole through the stud, the insertion body including an insertion end, a front end, and an open seam, so as to allow the insertion body to be pressed over a plumbing pipe even where an end of the plumbing pipe is not accessible;
    a faceplate attached to the front end of the insertion body, wherein the faceplate has a size and shape that is larger than the bore hole through the stud, so as to serve as a stop against the stud, when the insertion body is inserted into the bore hole through the stud;
    the insertion body including a first hollow channel for receipt of the plumbing pipe extending through the bore hole through the stud, wherein the plumbing pipe is received by the insertion body by spreading at the open seam; and
    the insertion body including a second hollow channel, concentric with and outside the first hollow channel, configured to receive a nail protection collar within the insertion body of the stud isolator with integrated nail protection, wherein the nail protection collar is a metal collar that slides into the second hollow channel, the metal nail protection collar including a gap that is aligned with the open seam of the insertion body.

2. The plumbing stud isolator with integrated nail protection as recited in claim 1, wherein the insertion body further includes a plurality of flexible pipe engaging ribs extending radially inwardly from the insertion body into the first hollow channel, so as to accommodate different diameters of plumbing pipe within the first hollow channel.

3. The plumbing stud isolator with integrated nail protection as recited in claim 2, wherein the flexible pipe engaging ribs are sized to accommodate receipt of either a nominal ¾ inch plumping pipe, or a nominal ½ inch plumping pipe into the first hollow channel, as selected by a user.

4. The plumbing stud isolator with integrated nail protection as recited in claim 1, further comprising the nail protection collar, wherein the nail protection collar is received into the second hollow channel.

5. The plumbing stud isolator with integrated nail protection as recited in claim 1, wherein the nail protection collar is configured as a generally hollow cylindrical shape.

6. The plumbing stud isolator with integrated nail protection as recited in claim 1, wherein the nail protection collar is configured as two initially separate pieces each having a generally c-shaped or generally semi-circular cross section, insertable into the second hollow channel so as to form a generally hollow clamshell cylindrical shape once inserted into the second hollow channel.

7. The plumbing stud isolator with integrated nail protection as recited in claim 1, wherein the nail protection collar is configured as a hinged metal collar that slides into the second hollow channel.

8. The plumbing stud isolator with integrated nail protection as recited in claim 7, wherein the hinged metal collar is received into the second hollow channel of the insertion body, the insertion body being formed of plastic and being sufficiently flexible so as to allow the insertion body with the hinged metal collar received therein to flex open, and be placed over the plumbing pipe.

9. The plumbing stud isolator with integrated nail protection as recited in claim 1, wherein the faceplate includes one or more holes therethrough, for receipt of nails to secure the isolator to a face of a stud.

10. The plumbing stud isolator with integrated nail protection as recited in claim 1, wherein the nail protection collar is configured as a one-piece fixed metal collar that slides or is otherwise received into the second hollow channel.

11. The plumbing stud isolator with integrated nail protection as recited in claim 10, wherein the fixed metal collar is open at a bottom end, so as to allow the fixed metal collar to be fitted over the plumbing pipe, and then slid into the bore hole once received into the second hollow channel of the insertion body of the isolator.

12. A method of installing a plumbing stud isolator with integrated nail protection, the method comprising:

providing a stud isolator with integrated nail protection comprising:
  an insertion body sized and configured for insertion into a bore hole through a stud, wherein the insertion body includes a periphery that engages with edges of the bore hole through the stud, and/or extends outward towards edges of the bore hole through the stud, the insertion body including an insertion end, a front end, and an open seam, so as to allow the insertion body to be pressed over a plumbing pipe even where an end of the plumbing pipe is not accessible;
  a faceplate attached to the front end of the insertion body, wherein the faceplate has a size and shape that is larger than the bore hole through the stud, so as to serve as a stop against the stud, when the insertion body is inserted into the bore hole through the stud;
  the insertion body including a first hollow channel for receipt of the plumbing pipe extending through the bore hole through the stud, wherein the plumbing pipe is received by the insertion body by spreading at the open seam;
  the insertion body including a second hollow channel, concentric with and outside the first hollow channel, configured to receive a nail protection collar within the insertion body of the stud isolator with integrated nail protection, wherein the nail protection collar is a metal collar that slides into the second hollow channel, the metal nail protection collar including a gap that is aligned with the open seam of the insertion body;
  positioning the nail protection collar over a plumbing pipe;
  integrating the nail protection collar with the insertion body, so that the nail protection collar is received into the insertion body of the isolator; and
  inserting the integrated insertion body and nail protection collar into the bore hole of the stud, so as to provide both isolation of the plumbing pipe and nail protection to the plumbing pipe, without installation of any nail protection plate over a face of the stud.

13. The method as recited in claim 12, wherein the insertion body further includes a plurality of flexible pipe engaging ribs extending radially inwardly from the insertion body into the first hollow channel, so as to accommodate different diameters of plumbing pipe within the first hollow channel.

14. The method as recited in claim 12, wherein the nail protection collar is visible once installed with the insertion body into the bore hole through the stud, so as to allow a user or building inspector to visibly verify that the nail protection collar is properly installed, once the isolator is installed in the stud.

* * * * *